US011930223B2

(12) United States Patent
Ma et al.

(10) Patent No.: US 11,930,223 B2
(45) Date of Patent: *Mar. 12, 2024

(54) METHOD FOR PICTURE DECODING, DECODER AND STORAGE MEDIUM

(71) Applicant: GUANGDONG OPPO MOBILE TELECOMMUNICATIONS CORP., LTD., Guangdong (CN)

(72) Inventors: Yanzhuo Ma, Dongguan (CN); Junyan Huo, Dongguan (CN); Qiang Gao, Dongguan (CN); Fuzheng Yang, Dongguan (CN); Shuai Wan, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,980

(22) Filed: Oct. 18, 2022

(65) Prior Publication Data
US 2023/0048779 A1 Feb. 16, 2023

Related U.S. Application Data

(63) Continuation of application No. 17/386,220, filed on Jul. 27, 2021, now Pat. No. 11,516,516, which is a
(Continued)

(51) Int. Cl.
*H04N 19/96* (2014.01)
*H04N 19/132* (2014.01)
(Continued)

(52) U.S. Cl.
CPC .......... *H04N 19/96* (2014.11); *H04N 19/132* (2014.11); *H04N 19/167* (2014.11); *H04N 19/196* (2014.11); *H04N 19/44* (2014.11)

(58) Field of Classification Search
CPC .... H04N 19/96; H04N 19/132; H04N 19/167; H04N 19/196; H04N 19/44
See application file for complete search history.

(56) References Cited

U.S. PATENT DOCUMENTS 9,398,293 B2    7/2016  Wang
9,491,457 B2   11/2016  Wang
(Continued)

FOREIGN PATENT DOCUMENTS

CN    104321970 A    1/2015
CN    104823449 A    8/2015
(Continued)

OTHER PUBLICATIONS

International Search Report in the international application No. PCT/CN2019/083966, dated Jan. 2, 2020.
(Continued)

*Primary Examiner* — Zaihan Jiang
(74) *Attorney, Agent, or Firm* — PERKINS COIE LLP

(57) ABSTRACT

An image decoding method, a decoder and a storage medium are provided. The method includes: receiving code stream data, and parsing the code stream data to obtain a coding tree unit corresponding to the code stream data; parsing an i-th node of i-th layer corresponding to the coding tree unit to obtain i-th state parameter and i-th flag parameter corresponding to the i-th node; performing detection processing on the i-th node according to the i-th state parameter and the i-th flag parameter to obtain an i-th detection result; acquiring a (i+1)th node of a (i+1)th layer corresponding to the coding tree unit; continuing to perform detection processing on the (i+1)th node, and traversing all the nodes corresponding to the coding tree unit until all the coding unit
(Continued)

data corresponding to the coding tree unit is obtained; and generating a decoded image corresponding to the code stream data.

18 Claims, 23 Drawing Sheets

Related U.S. Application Data continuation of application No. PCT/CN2019/083966, filed on Apr. 23, 2019.

(51) Int. Cl.
*H04N 19/167* (2014.01)
*H04N 19/196* (2014.01)
*H04N 19/44* (2014.01)

(56) References Cited

U.S. PATENT DOCUMENTS

| | | | |
|---|---|---|---|
| 9,503,719 | B2 | 11/2016 | Wenhao |
| 9,965,871 | B1 | 5/2018 | Li et al. |
| 2005/0063596 | A1 | 3/2005 | Yomdin et al. |
| 2005/0122337 | A1 | 6/2005 | Chen |
| 2011/0051812 | A1 | 3/2011 | Tanaka |
| 2011/0317771 | A1* | 12/2011 | Chen .................. G11B 27/007 375/E7.027 |
| 2014/0092963 | A1 | 4/2014 | Wang |
| 2014/0185669 | A1 | 7/2014 | Zhang et al. |
| 2014/0192896 | A1 | 7/2014 | Wang et al. |
| 2014/0192897 | A1 | 7/2014 | Wang et al. |
| 2014/0362930 | A1 | 12/2014 | Brockmann et al. |
| 2015/0016531 | A1 | 1/2015 | Hannuksela |
| 2015/0146780 | A1* | 5/2015 | Miyoshi .............. H04N 19/167 375/240.12 |
| 2015/0156486 | A1 | 6/2015 | Miyoshi |
| 2015/0271510 | A1* | 9/2015 | Wen .................... H04N 19/176 375/240.02 |
| 2017/0099491 | A1 | 4/2017 | Lei et al. |
| 2017/0155941 | A1 | 6/2017 | Rieger et al. |
| 2017/0208336 | A1 | 7/2017 | Li |
| 2017/0272750 | A1 | 9/2017 | An |
| 2017/0347096 | A1* | 11/2017 | Hong .................. H04N 19/159 |
| 2017/0347103 | A1 | 11/2017 | Yu et al. |
| 2017/0347128 | A1* | 11/2017 | Panusopone ......... H04N 19/172 |
| 2019/0253711 | A1 | 8/2019 | Hong et al. |
| 2020/0267387 | A1 | 8/2020 | Hong et al. |
| 2021/0218963 | A1* | 7/2021 | Panusopone ......... H04N 19/521 |
| 2021/0360292 | A1 | 11/2021 | Ma et al. |
| 2021/0409691 | A1 | 12/2021 | Hendry et al. |
| 2022/0038731 | A1 | 2/2022 | Ma et al. |
| 2022/0182627 | A1 | 6/2022 | Hong |

FOREIGN PATENT DOCUMENTS

| | | | |
|---|---|---|---|
| CN | 105704491 | A | 6/2016 |
| CN | 107079160 | A | 8/2017 |
| EP | 2941878 | A1 | 11/2015 |
| EP | 2941878 | B1 | 12/2019 |
| IN | 105531999 | A | 4/2016 |
| WO | 2017205704 | A1 | 11/2017 |
| WO | 2019001006 | A1 | 1/2019 |
| WO | 2019009314 | A1 | 1/2019 |
| WO | 2020215216 | A1 | 10/2020 |

OTHER PUBLICATIONS

Telecommunication Standardization Sector of ITU. "Series H: Audiovisual and Multimedia Systems: Infrastructure of audiovisual services-Coding of moving video: High efficiency video coding", ITU-T H.265, Feb. 28, 2018 (Feb. 28, 2018). main body, pp. 52-54 and 107.
Office Action of the Indian application No. 202117030750, dated Mar. 14, 2022.
Supplementary European Search Report in European application No. 19926365.8, dated May 30, 2022.
English translation of the Written Opinion of the International Search Authority in the international application No. PCT/CN2019/083966, dated Jan. 2, 2020.
H. Huang, et, al. "EE2.1: Quadtree plus binary tree structure integration with JEM tools", Joint Video Exploration Team (JVET) of ITU-T SG 16 WP 3 and ISO/IEC JTC 1/SC 29/WG 11 JVET-C0024, 3rd Meeting: Geneva, CH, May 26-Jun. 1, 2016.
Kiang Li, et, al. "Multi-Type-Tree", Joint Video Exploration Team (JVET) of ITU-T SG 16 WP 3 and ISO/IEC JTC 1/SC 29/WG 11 JVET-D0117, 4th Meeting: Chengdu, CN, Oct. 15-21, 2016.
Jianle Chen, "Algorithm description for Versatile Video Coding and Test Model 1 (VTM 1)", Joint Video Experts Team (JVET) of ITU-T SG 16 WP 3 and ISO/IEC JTC 1/SC 29/WG 11 JVET-J1002-v1, 10th Meeting: San Diego, US, Apr. 10-20, 2018.
Correction of Notice of Allowance of the European application No. 19926365.8, dated Mar. 29, 2023. 80 pages.
Supplementary European Search Report in the European application No. 23159500.0, dated May 23, 2023. 6 bages.
First Office Action of the Japanese application No. 2021-562351, dated Apr. 11, 2023. 4 pages with English translation.
Notice of Allowance of the Japanese application No. 2021-562351, dated Jun. 6, 2023. 5 pages with English translation.
First Office Action of the U.S. Appl. No. 17/386,220, dated Nov. 10, 2021.
Final Office Action of the U.S. Appl. No. 17/386,220, dated Feb. 22, 2022.
Advisory Action of the U.S. Appl. No. 17/386,220, dated May 18, 2022.
Notice of Allowance of the U.S. Appl. No. 17/386,220, dated Aug. 4, 2022.
ZHANG Wei, "Design and Implementation of Codec Chip Based on QC-LDPC Variable Code Length and Code Rate", University of Electronic Science and Technology of China Master dissertation, Mar. 19, 2018, http://www.cnki.net. 83 pages.
First Office Action of the Chinese application No. 202110943094.6, dated Nov. 1, 2022. 12 pages with English translation.
First Office Action of the Indonesian application No. P00202106990, dated Aug. 11, 2023, 3 pages with English translation.

\* cited by examiner

Background CU     Refreshing CU

METHOD FOR PICTURE DECODING, DECODER AND STORAGE MEDIUM

CROSS-REFERENCE TO RELATED APPLICATIONS

The application is a U.S. continuation application of U.S. patent application Ser. No. 17/386,220 filed on Jul. 27, 2021, which is a continuation application of PCT Application No. PCT/CN2019/083966 filed on Apr. 23, 2019. The disclosures of the above applications are hereby incorporated by reference in their entirety.

BACKGROUND

At present, a technical solution to video coding mainly refers to partitioning a space region of a picture into small blocks that are not overlapped with each other as basic units for coding using a partitioning technology and then coding the small blocks. Commonly used multi-type-tree (MTT) is evolved step by step from Quadtree (QT) to Quad-Tree-Binary-Tree (QTBT) and then further in combination with Ternary Tree (TT). Therefore, the only difference of QT, QTBT, and MTT is that partitioning manners for picture partitioning are different, and the partitioning principles of the three technologies are the same.

Detailed partitioning is usually needed to be performed on each frame of picture during video coding to achieve a relatively good coding effect, and in addition, detailed partitioning may generate more header information and repeated information representations due to a fixed partitioning solution in an existing video coding technology, so that the coding efficiency is reduced.

SUMMARY

Embodiments of the application relate to the technical field of video encoding and decoding, and particularly to a method for picture decoding, a decoder, and a storage medium.

The embodiments of the application provide a method for picture decoding, a decoder, and a storage medium, which may avoid excessively detailed block partitioning and effectively reduce the amount of header information, thereby improving the coding efficiency.

The technical solutions of the embodiments of the application are implemented as follows.

In a first aspect, a method for picture decoding is provided, which may include the following operations.

Bitstream data is received, and the bitstream data is parsed to obtain a Coding Tree Unit (CTU) corresponding to the bitstream data.

An ith node of an ith layer corresponding to the CTU is parsed to obtain an ith state parameter and ith flag parameter corresponding to the ith node, i being an integer greater than 0, the ith state parameter being configured to determine whether the ith node supports refreshing, and the ith flag parameter being configured to determine whether the ith node enables refreshing.

Detection processing is performed on the ith node according to the ith state parameter and the ith flag parameter to obtain an ith detection result.

An (i+1)th node of an (i+1)th layer corresponding to the CTU is acquired according to the ith detection result.

Detection processing is continued to be performed on the (i+1)th node, and all nodes corresponding to the CTU are traversed until data of all Coding Units (CUs) corresponding to the CTU is obtained.

A decoded picture corresponding to the bitstream data is generated according to the all nodes and the data of all CUs.

In a second aspect, a decoder is provided. The decoder comprises a processor and a memory storing instructions executable by the processor. When the instructions are executed by the processor, the processor is configured to receive bitstream data, parse the bitstream data to obtain a Coding Tree Unit (CTU) corresponding to the bitstream data, parse a node of a layer corresponding to the CTU to determine a state parameter and a flag parameter corresponding to the node, the state parameter being configured to determine whether the node supports refreshing, and the flag parameter being configured to determine whether the node enables refreshing, perform detection processing on the node according to a leaf parameter, the state parameter and the flag parameter to obtain a detection result, continue to acquire a node of a next layer corresponding to the CTU according to the detection result, continue to perform detection processing on the node of the next layer, and obtain data of all Coding Units (CUs) corresponding to the CTU, and generate a decoded picture corresponding to the bitstream data according to the node and the data of all Cus.

In a third aspect, a computer-readable storage medium is provided. The computer-readable storage medium has stored therein a computer program which is applied to a decoder and is executed by a processor to perform the method for picture decoding of the above first aspect.

DETAILED DESCRIPTION

Figure 1:
FIG. 1 is a first schematic diagram of partitioning using QT.

The embodiments of the application provide the method for picture decoding, the decoder, and the storage medium. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and the all nodes corresponding to the CTU are traversed until data of all CUs corresponding to the CTU is obtained. The decoded picture corresponding to the bitstream data is generated according to the all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and then decoding processing is performed on a node with data, to obtain all CUs corresponding to the CTU to obtain a corresponding decoded picture. Since overlapping partitioning of CUs is supported during coding, if all the CUs, obtained by the decoder by decoding nodes with data, include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed and repeated representations of data with similar features in the same region may be avoided, and the coding efficiency may further be improved.

The technical solutions in the embodiments of the application will be clearly and completely described below in combination with the drawings in the embodiments of the application. It is to be understood that the specific embodiments described here are adopted not to limit the related application but only to explain the application. In addition, it is also to be noted that, for convenient description, only parts related to the application are illustrated in the drawings.

Encoding a video refers to encoding the pictures one frame by one frame. Similarly, decoding a video bitstream obtained by coding compression on a video refers to decoding the bitstream of pictures one frame by one frame. In almost all international video picture coding standards, when a frame of picture is coded, the frame of picture is required to be partitioned into a plurality of sub pictures with M×M pixels, called CUs, and the sub pictures are coded one by one by taking a CU as a basic coding unit. Generally, M may be 4, 8, 16, 32, or 64. Therefore, encoding a video pictures sequence refers to sequentially encoding each coding unit, i.e., each CU, of each frame of picture. Decoding a bitstream of a video picture sequence refers to sequentially decoding each CU of each frame of picture to finally reconstruct the whole video picture sequence.

For adapting to differences of contents and properties of picture contents of each part in a frame of picture and pertinently performing most effective coding, sizes of CUs in the frame of picture may be different, some are 8×8, some are 64×64, etc. For seamlessly stitching CUs with different sizes, a frame of picture is usually partitioned into Largest Coding Units (LCUs) or CTUs with the completely same size of N×N pixels at first, and then each LCU is further partitioned into multiple CUs that may be the same or different in size. For example, a frame of picture is partitioned into LCUs with the completely same size of 64×64 pixels at first, namely N=64. A certain LCU is formed by three CUs with 32×32 pixels and four CUs with 16×16 pixels, and another LCU is formed by two CUs with 32×32 pixels, three CUs with 16×16 pixels, and 20 CUs with 8×8 pixels. The CU may further be partitioned into a plurality of sub regions. The sub region includes, but not limited to, a Prediction Unit (PU) and a Transformation Unit (TU). In summary, an encoding block or a decoding block refers to a region that is encoded or decoded in a frame of picture.

A CU is a region formed by a plurality of pixel values. A shape of the CU may a rectangle. Each CU in a frame of picture may be different in shape and size.

Figure 2:
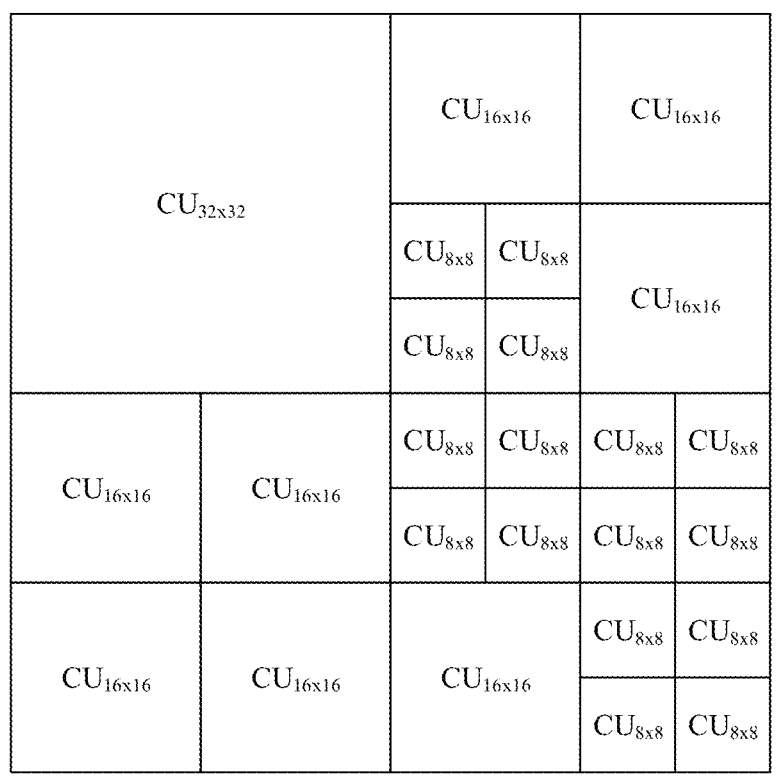
FIG. 2 is a second schematic diagram of partitioning using QT.

In H.265/High Efficiency Video Coding (HEVC), QT may be used to perform non-overlapping partitioning of CUs or coding blocks. FIG. 1 is a first schematic diagram of partitioning using QT. As shown in FIG. 1, a frame of picture is partitioned into multiple regions with the same size by rows and columns, each region being called a CTU. A side length of a CTU may be 128 pixels, 64 pixels, etc. Such partitioning is horizontal and vertical hard partitioning, so that the CTUs may not overlap. FIG. 2 is a second schematic diagram of partitioning using QT. As shown in FIG. 2, a CTU is progressively partitioned into multiple CUs in a QT manner. Sizes of the multiple CUs are not all the same, and there are CUs with 8×8 pixels, 16×16 pixels, and CUs with 32×32 pixels. The CUs have no overlapping regions, and all the CUs are leaf nodes obtained by QT partitioning. Similarly, such partitioning is horizontal and vertical hard partitioning, so that the CUs obtained by partitioning any CTU may not overlap.

In an existing H.266/Versatile Video Coding (VVC)-based video coding technology, BT is added based on QT to form QTBT, and a TT partitioning manner is further added to form MTT. Various partitioning manners in MTT, such as QT partitioning, vertical BT partitioning, horizontal BT partitioning, vertical center/both-side TT partitioning, and horizontal center/both-side TT partitioning, are all used on each layer in a CTU.

Figure 3:
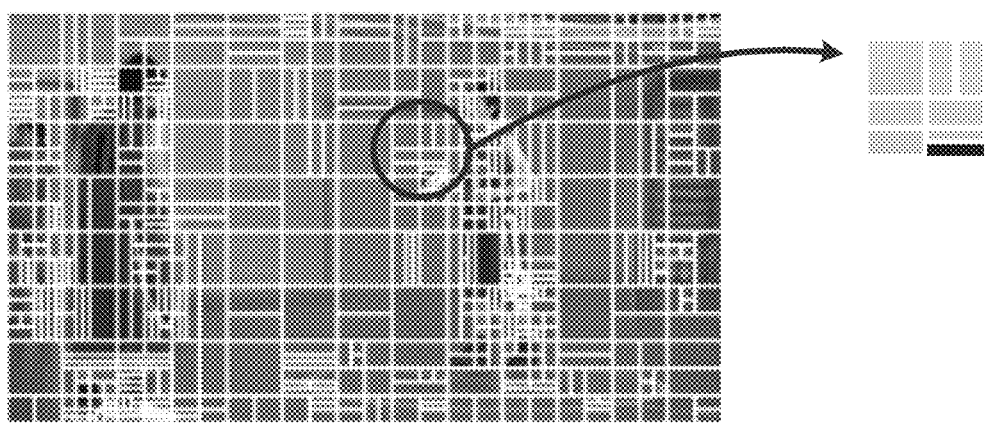
FIG. 3 is a schematic diagram of over-partitioning.

It can thus be seen that a present MTT solution is coherently evolved step by step from QT to QTBT and then in combination with TT. The only difference of QT, QTBT, and MTT is that partitioning manners are different, and the three use the same partitioning principle of no overlaps between CUs. That is, since all present partitioning solutions do not allow overlapping regions between CUs, a fixed partitioning manner makes it necessary to perform detailed partitioning on an irregular edge of an object to achieve a relatively good video coding effect. On the other aspect, detailed partitioning generates more header information. Therefore, the coding efficiency may be reduced. With the diversification of partitioning modes, some problems of detailed partitioning have been solved, but the problem of over-partitioning still exists. FIG. 3 is a schematic diagram of over-partitioning. As shown in FIG. 3, after the region at the upper edge of the ball held by the player on the right side is partitioned and amplified, it can be seen that most of the region is a similar background flat region, and only the top end of the ball is a content different from the other region in the block. For partitioning a corresponding region, a final partitioning result is quite detailed. It can be seen that detailed partitioning is usually needed to be performed on each frame of picture in an existing coding technology to achieve a relatively good coding effect, but detailed partitioning may generate more header information and repeated information representations, so that the coding efficiency is reduced.

Figure 4:
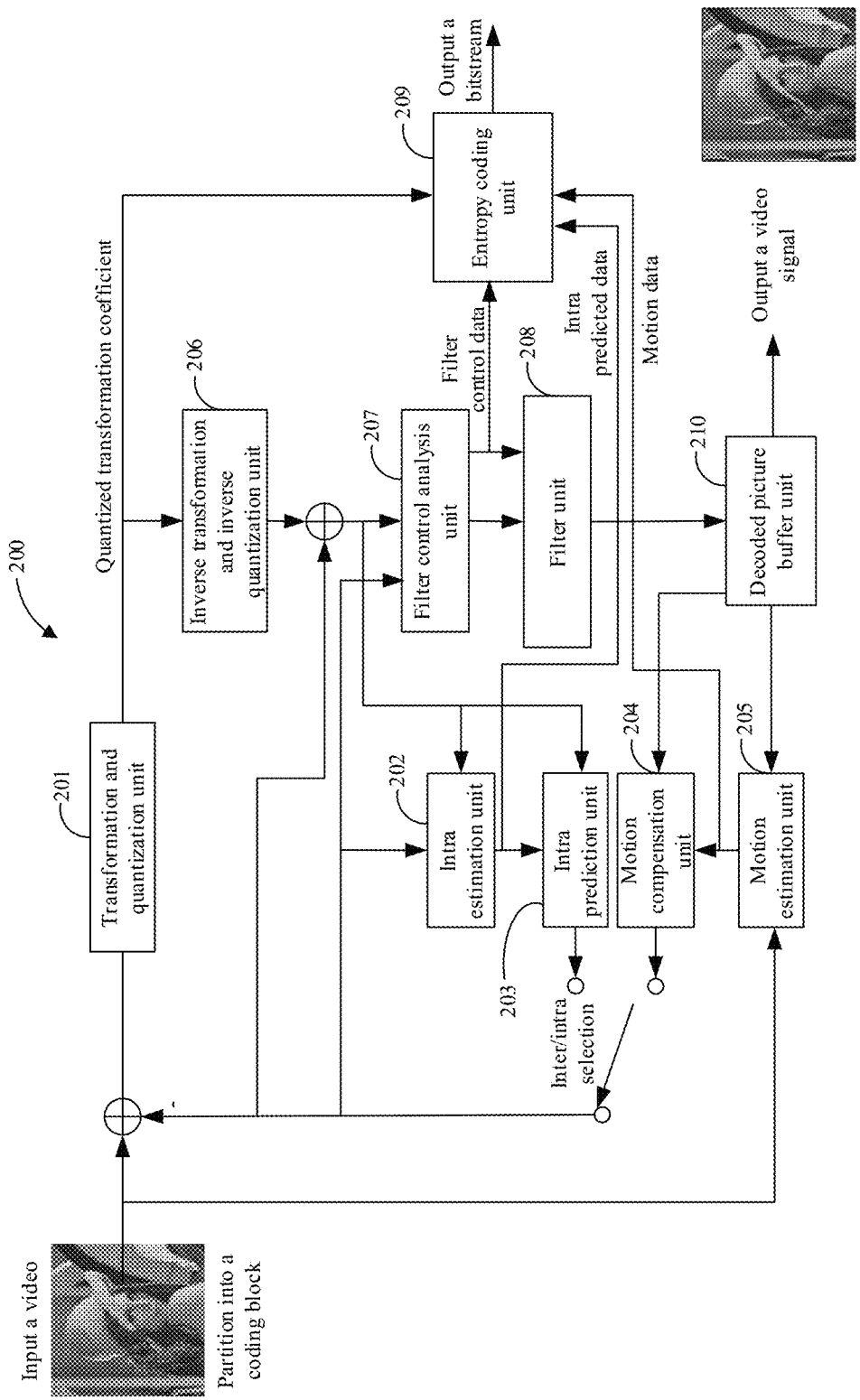
FIG. 4 is a composition structure diagram of a video encoding system.

The embodiments of the application disclose a method for picture decoding. Excessively detailed block partitioning over pictures may be avoided, the amount of header information may be reduced effectively, and repeated information representations may be avoided, so that the coding efficiency is improved. The decoding method may be applied to a combined part of block partitioning and intra and inter prediction signals in a hybrid video coding framework. Specifically, the decoding method may also be applied to a buffer part in the hybrid video coding framework. For example, FIG. 4 is a composition structure diagram of a video coding system. As shown in FIG. 4, the video coding system 200 includes a transformation and quantization unit 201, an intra estimation unit 202, an intra prediction unit 203, a motion compensation unit 204, a motion estimation unit 205, an inverse transformation and inverse quantization unit 206, a filter control analysis unit 207, a filter unit 208, an entropy coding unit 209, a decoded picture buffer unit 210, etc. The filter unit 208 may implement deblocking filtering and Sample Adaptive Offset (SAO) filtering. The entropy coding unit 209 may implement header information coding and Context-based Adaptive Binary Arithmetic Coding (CABAC).

When it is detected that an original video signal is received, for the input original video signal, video coding blocks may be obtained by partitioning of a CTU, and then residual pixel information obtained by intra or inter prediction is processed through the transformation and quantization unit 201 to transform the video coding blocks, including transforming the residual information from a pixel domain to a transformation domain and quantizing the obtained transformation coefficient to further reduce a bit rate. The intra estimation unit 202 and the intra prediction unit 203 are configured to perform intra prediction on the video coding blocks. Exactly, the intra estimation unit 202 and the intra prediction unit 203 are configured to determine an intra prediction mode to be adopted to code the video coding blocks. The motion compensation unit 204 and the motion estimation unit 205 are configured to execute intra prediction coding on the received video coding blocks relative to one or more blocks in one or more reference frames to provide time prediction information. Motion estimation executed by the motion estimation unit 205 is a process of generating a motion vector. The motion vector may be used for estimating a motion of the video coding block. Then the motion compensation unit 204 executes motion compensation based on the motion vector determined by the motion estimation unit 205. After the intra prediction mode is determined, the intra prediction unit 203 is further configured to provide selected intra predicted data for the entropy coding unit 209, and the motion estimation unit 205 also sends motion vector data determined by calculation to the entropy coding unit 209. In addition, the inverse transformation and inverse quantization unit 206 is configured to reconstruct the video coding block, namely a residual block is reconstructed in the pixel domain, an artifact of a blocking effect in the reconstructed residual block is removed through the filter control analysis unit 207 and the filter unit 208 and then the reconstructed residual block is added to a predictive block in a frame of the decoded picture buffer unit 210 to generate a reconstructed video coding block. The entropy coding unit 209 is configured to code various coding parameters and quantized transformation coefficients. In a CABAC-based coding algorithm, a context content may be configured to code information indicating the determined intra prediction mode based on neighbouring coding blocks to output a bitstream of the video signal. The decoded picture buffer unit 210 is configured to store the reconstructed video coding block as a prediction reference. As video pictures are coded, new reconstructed video coding blocks may be continuously generated, and all these reconstructed video coding blocks may be stored in the decoded picture buffer unit 210.

Figure 5:
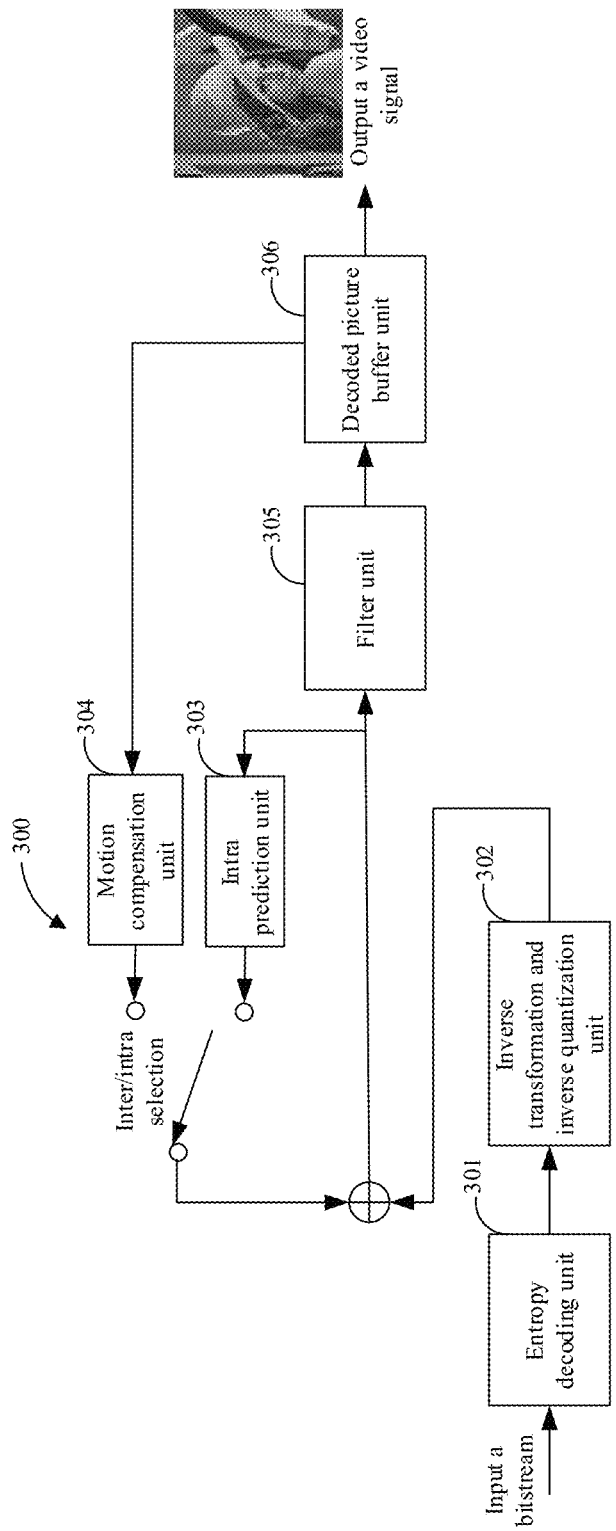
FIG. 5 is a composition structure diagram of a video decoding system.

FIG. 5 is a composition structure diagram of a video decoding system. As shown in FIG. 5, the video decoding system 300 includes an entropy decoding unit 301, an inverse transformation and inverse quantization unit 302, an intra prediction unit 303, a motion compensation unit 304, a filter unit 305 and a decoded picture buffer unit 306, etc. The entropy decoding unit 301 may implement header information decoding and CABAC decoding. The filter unit 305 may implement deblocking filtering and SAO filtering. After coding processing shown in FIG. 4 is performed on an input video signal, a bitstream of the video signal is output. The bitstream is input to the video decoding system 300, and is processed through the entropy decoding unit 301 at first to obtain a decoded transformation coefficient. A residual block is generated in a pixel domain by processing of the inverse transformation and inverse quantization unit 302 for the transformation coefficient. The intra prediction unit 303 may be configured to generate predicted data of a current video decoding block based on a determined intra prediction mode and data of a previous decoded block from a current frame or picture. The motion compensation unit 304 determines prediction information for the video decoding block by analyzing a motion vector and other associated syntactic elements and generates a predictive block of the video decoding block that is currently decoded by use of the prediction information. The residual block from the inverse transformation and inverse quantization unit 302 and the corresponding predictive block generated by the intra prediction unit 303 or the motion compensation unit 304 are summed to form a decoded video block. An artifact of a blocking effect in the decoded video signal may be removed through the filter unit 305 to improve the video quality. Then, the decoded video block is stored in the decoded picture buffer unit 306. The decoded picture buffer unit 306 stores a reference picture for subsequent intra prediction or motion compensation and is also configured to output a video signal, namely the recovered original video signal is obtained.

The method for picture decoding disclosed in the disclosure may be applied to the encoding/decoding framework shown in FIG. 4 and FIG. 5, but no specific limits are made thereto in the embodiments of the application.

The technical solutions in the embodiments of the application will be clearly and completely described below in combination with the drawings in the embodiments of the application.

Figure 6:
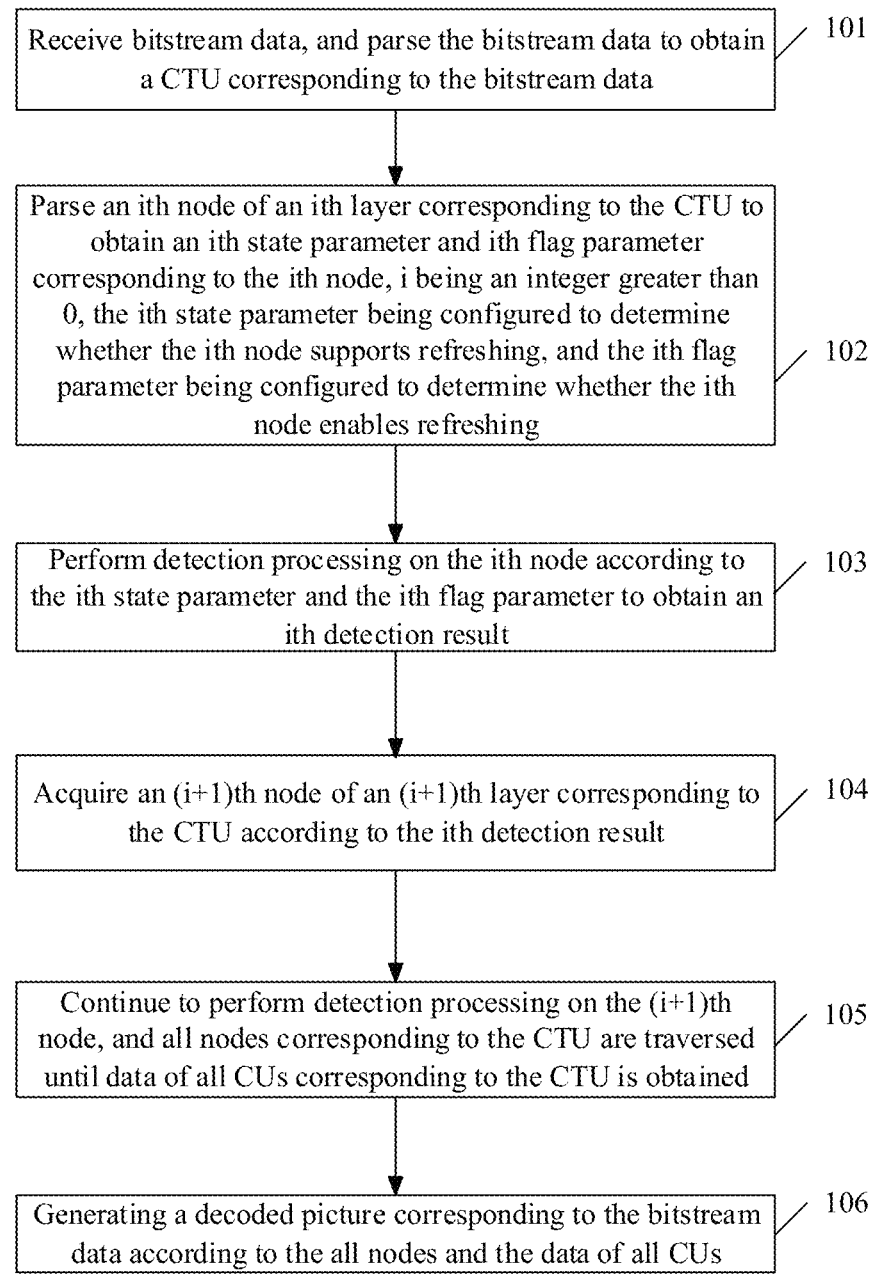
FIG. 6 is an implementation flowchart of a method for picture decoding according to embodiments of the application.

In an embodiment of the application, FIG. 6 is an implementation flowchart of a method for picture decoding according to embodiments of the application. As shown in FIG. 6, in the embodiments of the application, the method for picture decoding performed by a decoder may include the following operations.

In 101, bitstream data is received, and the bitstream data is parsed to obtain a CTU corresponding to the bitstream data.

In the embodiments of the application, the decoder may receive the bitstream data, and then parse the received bitstream data to obtain the CTU corresponding to the bitstream data. The decoder may obtain at least one CTU with the same size after parsing the bitstream data.

It is to be noted that, in the embodiments of the application, an encoder encodes multiple frames of pictures in a video one by one during video encoding. The frame of picture under encoding at any moment may be called a current coded picture. The encoder, when encoding a current coded picture in the video, needs to partition the current coded picture into CTUs with the completely same size at first, and then continues to further partition the CTUs into CUs that are the same or different in size for encoding. For example, the encoder may partition the current coded picture to obtain CTUs with the completely same size of 64×64 pixels, namely CTUs formed by 64×64 pixels are obtained. In the embodiments of the application, the encoder allows the CUs to overlap when performing overlapping partitioning on the current coded picture. For implementing parallel processing and reducing the coding complexity, the CUs do not overlap.

It is to be noted that, in the embodiments of the application, the encoder may perform overlapping partitioning and encoding on the current coded picture using MTT to obtain bitstream data corresponding to the current coded picture, and the decoder may decode the current coded picture according to the bitstream data to obtain the CTUs and further obtain the CUs.

Furthermore, in the embodiments of the application, the decoder decodes bitstream data of multiple frames of pictures in a video one by one during video decoding. The frame of picture under decoding at any moment may be called a current decoding picture.

It is to be noted that, in the embodiments of the application, when the decoder decodes the current decoding picture, CTUs do not overlap, but CUs are allowed to overlap. That is, in the embodiments of the application, during decoding of the decoder, multiple CUs may simultaneously contain decoded pixel data of the same region at a position where a reconstructed frame is buffered. One CU is relatively large, and may be considered as a background CU, and one CU is relatively small, and may be considered as a refreshing CU. Data decoded and reconstructed by the background CU may be covered by pixel data of this position in the refreshing CU, and this is a refreshing process. In the application, such a decoding mode of refreshing the background CU using the refreshing CU is a refreshing decoding.

Furthermore, in the embodiments of the application, the decoder may select to enable the refreshing decoding for CU refreshing during video decoding. Specifically, the decoder may set high-layer control syntax, and it may be indicated whether the refreshing decoding is presently supported through enable switch syntax PPSRfrsEnbl or SPSRfrsEnbl in Picture Parameter Set (PPS) and Sequence Parameter Set (SPS).

That is, in the embodiments of the application, after the decoder receives the bitstream data and parses the bitstream data to obtain the CTU corresponding to the bitstream data, namely after 101, a preset refreshing mode may be enabled. Specifically, the preset refreshing mode may be configured for overlapping decoding between CUs.

In 102, an ith node of an ith layer corresponding to the CTU is parsed to obtain an ith state parameter and ith flag parameter corresponding to the ith node, i being an integer greater than 0, the ith state parameter being configured to determine whether the ith node supports refreshing, and the ith flag parameter being configured to determine whether the ith node enables refreshing.

In the embodiments of the application, the decoder may perform parsing processing on the ith node of the ith layer corresponding to the CTU at first to obtain the ith state parameter and ith flag parameter corresponding to the ith node. Specifically, i is an integer greater than 0. For example, i may be 1, 2, and 3.

It is to be noted that, in the embodiments of the application, the ith state parameter may be configured to determine a default state of the ith node. The ith state parameter may include an ith subtree default state and an ith data default state. Specifically, the ith subtree default state is configured to represent a state of whether the ith node supports refreshing, and the ith data default state is configured to determine whether the ith node has source data.

Furthermore, in the embodiments of the application, in a specific syntax for video encoding and decoding, the ith subtree default state may be determined through bRfrsEnblFlag, namely bRfrsEnblFlag may represent a state of whether a current node of the CTU supports refreshing. Specifically, it may be determined that the current node of the CTU does not support refreshing when bRfrsEnblFlag is assigned to 0, and it may be determined that the current node of the CTU supports refreshing when bRfrsEnblFlag is assigned to 1.

Furthermore, in the embodiments of the application, for a first node of a first layer of the CTU, namely when i=1, a default value of the ith subtree default state is SPSRfrsEnbl. SPSRfrsEnbl may be a flag of whether refreshing is supported, which may be stated in the SPS layer, or may be determined by enable control in the PPS layer. When i is not 1, the ith subtree default state may be determined through a subtree default state of an upper layer, namely the ith subtree default state may be determined according to an (i−1)th subtree default state.

Furthermore, in the embodiments of the application, in the specific syntax for video encoding and decoding, the ith data default state may be determined through bAncFlag, namely bAncFlag may represent whether the current node of the CTU has source data. Specifically, it may be determined that the current node of the CTU has no source data when bAncFlag is assigned to 0, and it may be determined that the current node of the CTU has the source data when bAncFlag is assigned to 1.

Furthermore, in the embodiments of the application, for the first node of the first layer of the CTU, namely when i=1, a default value of the ith data default state is 0. When i is not 1, the ith data default state may be determined through a data default state of the upper layer, namely the ith data default state may be determined according to an (i−1)th data default state.

It is to be noted that, in the embodiments of the application, the ith flag parameter may be configured to determine a data flag of the ith node. The ith state parameter may include an ith subtree identifier and an ith data identifier. Specifically, the ith subtree identifier is configured to represent whether there is a CU that may be refreshed on a subtree of the ith node, and the ith data identifier is configured to determine whether the ith node has data.

Furthermore, in the embodiments of the application, in the specific syntax for video encoding and decoding, the ith subtree identifier may be determined through Refresh_CU_enable_flag[x0][y0], namely Refresh_CU_enable_flag[x0][y0] may represent whether the current node of the CTU has a CU that may be refreshed. Specifically, it may be determined that the current node of the CTU has no CU that may be refreshed when Refresh_CU_enable_flag[x0][y0] is assigned to 0, and it may be determined that the current node of the CTU has the CU that may be refreshed when Refresh_CU_enable_flag[x0][y0] is assigned to 1.

Furthermore, in the embodiments of the application, in the specific syntax for video encoding and decoding, the ith data identifier may be determined through Refresh_CU_flag[x0][y0], namely Refresh_CU_flag[x0][y0] may represent whether the current node of the CTU has data. Specifically, it may be determined that the current node of the CTU has no data when Refresh_CU_flag[x0][y0] is assigned to 0, and it may be determined that the current node of the CTU has the data when Refresh_CU_flag[x0][y0] is assigned to 1.

Furthermore, in the embodiments of the application, in specific syntax transmission for video encoding and decoding, bAncFlag, Refresh_CU_enable_flag[x0][y0], and Refresh_CU_flag[x0][y0] may not be transmitted. Specifically, whether Refresh_CU_flag[x0][y0] and Refresh_CU_flag[x0][y0] exist depend on whether the current node is a leaf node and values of bRfrsEnblFlag and bAncFlag.

Figure 7:
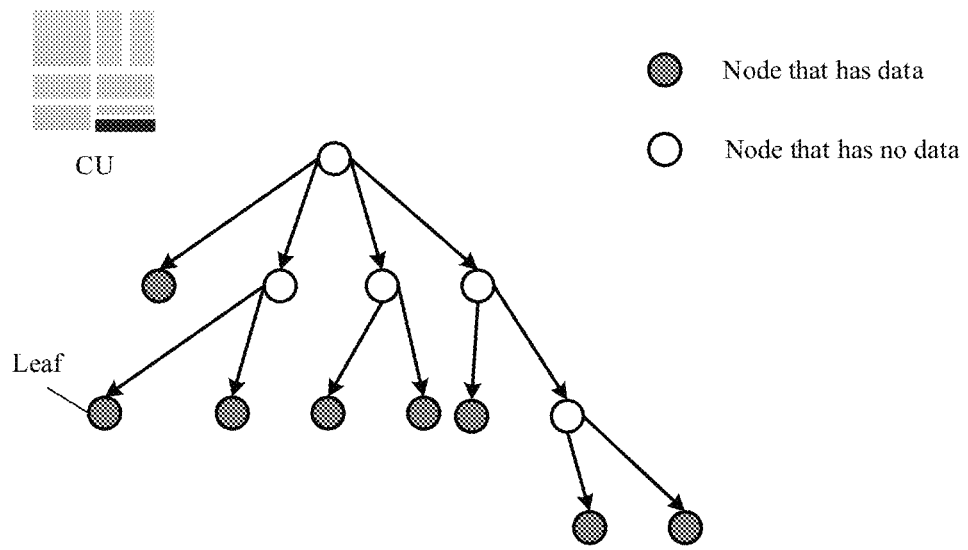
FIG. 7 is a structure diagram of a CTU according to the conventional art.
Figure 8:
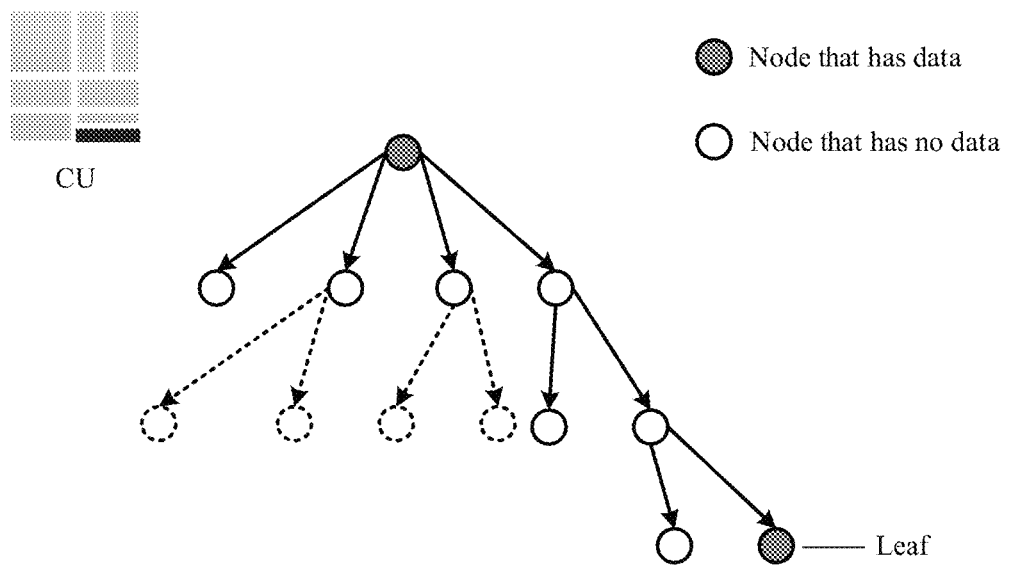
FIG. 8 is a structure diagram of a CTU according to embodiments of the application.

It is to be noted that, in the embodiments of the application, the CTU may correspond to at least one layer of nodes, and any node of each layer may have data. Data of an ancestor node may be covered by data of a descendant node thereof. Therefore, the decoder, when decoding the CTU, needs to detect whether the nodes have data layer by layer, and may further perform decoding processing on nodes with data to construct corresponding CUs. By contrast, in the conventional art, for a CTU, data only exists on nodes that may not be continued to be partitioned, i.e., leaves, in a tree structure, so that the decoder needs to perform parsing and decoding processing on each leaf. FIG. 7 is a structure diagram of a CTU according to the conventional art. FIG. 8 is a structure diagram of a CTU according to embodiments of the application. As shown in FIGS. 7 and 8, for a same CTU, since overlapping partitioning of CUs is not allowed in the conventional art, only leaves in a tree structure corresponding to the CTU may have data, and the decoder needs to perform data parsing on all the leaves to construct CUs during decoding. In the embodiments of the application, overlapping partitioning of CUs is allowed, so that data may exist on any intermediate node in the tree structure corresponding to the CTU. For any CTU, it is unnecessary to perform data parsing on all the leaves; and instead, it may be detected whether there is data on each node, and if there is data, decoding is performed to obtain a corresponding CU. In such a manner, partitioning of a large number of small blocks is avoided, and the decoding efficiency may be improved. Furthermore, in the embodiments of the application, the encoder, during picture encoding, not only takes a leaf node as an encoding unit, but also may perform compressive encoding on intermediate nodes. However, node information of part of descendant nodes needs to be removed from the intermediate nodes, which may be implemented by, for example, masks performed in a manner of zero padding, interpolation, or extension supplementation. Comparison between FIG. 7 and FIG. 8 shows that the encoder encodes multiple irregular regions in one region in a centralized manner, so that the detailing degree of coding partitioning may be reduced. A region originally different from a background is temporarily considered to be the same as other background regions by data extension to reduce the number of bits for representation, and a block different from the background further needs to be encoded independently to refresh and cover the background block to obtain a picture content the same as the original one. In such case, it is not needed to perform certain partitioning in the original partitioning tree, so that part of header information is reduced. Moreover, a flat picture region mainly includes low-frequency component, and all corresponding energy is concentrated in the upper-left corner of the region, reduction of partitioning is more favorable for energy concentration, and compared with over-partitioning, may also reduce part of frequency-domain data after pixel-domain transformation. Specifically, the dotted part in the partitioning tree in FIG. 8 has no valid data, so that partition information of this part may be omitted.

Furthermore, in the embodiments of the application, ith-layer data corresponding to the CTU may include at least one node, so that the ith node of the ith layer corresponding to the CTU means all nodes in the ith layer. That is, the decoder may perform detection processing on all the ith nodes of the ith layer corresponding to the CTU to obtain a detection result corresponding to each ith node, namely all detection results corresponding to all the nodes of the ith layer are obtained by detection.

In 103, detection processing is performed on the ith node according to the ith state parameter and the ith flag parameter to obtain an ith detection result.

In the embodiments of the application, the decoder, after performing parsing processing on the ith node of the ith layer corresponding to the CTU to obtain the ith state parameter and ith flag parameter corresponding to the ith node, may perform detection processing on the ith node according to the ith state parameter and the ith flag parameter to obtain the ith detection result.

It is to be noted that, in the embodiments of the application, the decoder, after determining the ith state parameter and the ith flag parameter, may further determine whether the ith node has data or not in combination with a leaf parameter of the ith node and according to the ith state parameter and the ith flag parameter.

Furthermore, in the embodiments of the application, the leaf parameter of the ith node may be configured to determine whether the ith node is a leaf in the CTUt.

It is to be noted that, in the embodiments of the application, the decoder, when performing detection processing on the ith node according to the ith state parameter and the ith flag parameter to obtain the ith detection result, may determine the leaf parameter corresponding to the ith node at first, the leaf parameter being configured to determine whether to continue to partition the ith node or not, and then obtain the ith detection result according to the leaf parameter, the ith state parameter and the ith flag parameter. That is, the decoder may determine whether the ith node may be continued to be partitioned according to the leaf parameter corresponding to the ith node.

Furthermore, in the embodiments of the application, for determining whether the ith node has data and may be continued to be partitioned, the decoder performs detection processing on the ith node, and correspondingly, the ith detection result may include four results, i.e., the node has data and is to be partitioned, the node has no data and is to be partitioned, the node has data and is not to be partitioned, and the node has no data and is not to be partitioned.

It is to be noted that, in the embodiments of the application, in specific syntax transmission for video encoding and decoding, since bAncFlag, RefreshSU_enable_flag[x0][y0], and Refresh_CU_flag[x0][y0] may not be transmitted, the decoder needs to further infer and determine whether the ith node has data according to the leaf parameter, the ith state parameter, and the ith flag parameter.

In 104, an (i+1)th node of an (i+1)th layer corresponding to the CTU is acquired according to the ith detection result.

In the embodiments of the application, the decoder, after performing detection processing on the ith node according to the ith state parameter and the ith flag parameter to obtain the ith detection result, may acquire the (i+1)th node of the (i+1)th layer corresponding to the CTU according to the ith detection result.

It is to be noted that, in the embodiments of the application, after the decoder performs detection processing to obtain the ith detection result, since the ith detection result may include four results, i.e., the node has data and is to be partitioned, the node has no data and is to be partitioned, the node has data and is not to be partitioned, and the node has no data and is not to be partitioned may be obtained, the decoder may further correspondingly process the ith node according to different detection results.

Furthermore, in the embodiments of the application, when the ith detection result is that the node has data and is to be partitioning, the decoder may acquire ith CU data of the ith layer, and then perform partitioning processing on the ith node to obtain the (i+1)th node of the (i+1)th layer corresponding to the CTU.

It is to be noted that, in the embodiments of the application, if the decoder determines that the ith node has data and partitioning processing may be continued to be performed on the ith node after performing detection processing on the ith node, the decoder needs to acquire corresponding data at first, namely obtaining the data of the ith CU corresponding to the ith node in the CTU. Since the ith layer corresponding to the CTU may include at least one ith node, the decoder, after sequentially performing detection processing on all the ith nodes of the ith layer, may perform data acquisition on the ith node of which the detection result is that there is data to obtain the data of the ith CU corresponding to the ith node. Furthermore, the decoder, after obtaining the corresponding data of the ith CU, may continue to perform partitioning processing on the ith node to obtain a node of a lower layer of the ith layer, namely obtaining the (i+1)th node of the (i+1)th layer corresponding to the CTU.

Furthermore, in the embodiments of the application, when the ith detection result is the node has no data and is to be partitioned, partitioning processing is performed on the ith node to obtain the (i+1)th node of the (i+1)th layer corresponding to the CTU. In the embodiments of the application, after the decoder performs detection processing on the ith node of the ith layer corresponding to the CTU to obtain the ith detection result, if the ith detection result is that the node has no data and is to be partitioned, the decoder does not need to perform data acquisition, but directly performs partitioning processing to obtain the node of the lower layer, i.e., the (i+1)th node of the (i+1)th layer.

Furthermore, in the embodiments of the application, since the ith layer corresponding to the CTU may include at least one ith node, the decoder, after sequentially performing detection processing on all the ith nodes of the ith layer, may perform partitioning processing on the ith node of which the detection result is that partitioning may be continued to obtain the (i+1)th node of the (i+1)th layer corresponding to each ith node. That is, for each ith node that may be continued to be partitioned, the decoder may obtain at least one (i+1)th node by partitioning.

It can thus be seen that, in the embodiments of the application, if the ith node may be partitioned, no matter whether the ith node has data, the decoder needs to continue to perform partitioning processing on the ith node, thereby obtaining the (i+1)th node of the (i+1)th layer.

Furthermore, in the embodiments of the application, when the ith detection result is that the node has data and is not to be partitioned, the data of the ith CU of the ith layer is acquired, and parsing processing of the ith node is ended.

It is to be noted that, in the embodiments of the application, if the decoder determines that the ith node has data and partitioning processing may not be continued to be performed on the ith node after performing detection processing on the ith node, the decoder needs to acquire corresponding data at first, namely obtaining the data of the ith CU corresponding to the ith node in the CTU. Since the ith layer corresponding to the CTU may include at least one ith node, the decoder, after sequentially performing detection processing on all the ith nodes of the ith layer, may perform data acquisition on the ith node of which the detection result is that there is data to obtain the data of the ith CU corresponding to the ith node. Furthermore, since the ith node may not be continued to be partitioned, the decoder may end parsing processing of the ith node after obtaining the corresponding data of the ith CU.

Furthermore, in the embodiments of the application, when the ith detection result is the node has no data and is not to be partitioned, the decoder does not need to perform data acquisition, meanwhile, also does not need to perform partitioning processing, but directly ends parsing processing of the ith node.

It is to be noted that, in the embodiments of the application, the encoder may determine whether there is data in each rectangular region generated by partitioning, and if there is data, acquire CU data corresponding to this node. For example, for the ith node that has data, the data of the ith CU corresponding to the ith node may be acquired. Furthermore, in the embodiments of the application, the data of the ith CU may include identification information, prediction information, a transformation coefficient, etc. Furthermore, the decoder may obtain corresponding ith background pixel data according to the data of the ith CU.

In 105, detection processing is continued to be performed on the (i+1)th node, and all nodes corresponding to the CTU are traversed until data of all CUs corresponding to the CTU is obtained.

In the embodiments of the application, the decoder, after acquiring the (i+1)th node of the (i+1)th layer corresponding to the CTU according to the ith detection result, may continue to perform detection processing on the (i+1)th node, and then traverse all the nodes corresponding to the CTU, namely detection processing is performed on all the nodes of the CTU until all the CUs corresponding to the CTU are obtained.

It is to be noted that, in the embodiments of the application, the decoder, after obtaining the (i+1)th node of the (i+1)th layer by partitioning, may continue to perform detection processing on the (i+1)th node according to the method from 101 to 104 to obtain data of the (i+1)th CU corresponding to the (i+1)th node and an (i+2)th node of an (i+2)th layer, and may obtain data of all the CUs corresponding to the CTU after recursive processing according to the method from 101 to 104.

Furthermore, in the embodiments of the application, for a node of any layer of the CTU, the decoder may perform recursive processing according to the method from 101 to 104. That is, for any one node, the decoder may perform detection processing according to a state parameter and a flag parameter. For a node that has data and is to be partitioned, data acquisition is performed to obtain data of corresponding CU, and partitioning processing is continued to be performed to obtain a node of the lower layer. For a node that has no data and is to be partitioned, partitioning processing is directly performed to obtain a node of the lower layer. For a node that has data and is not to be partitioned, data acquisition is performed to obtain data of corresponding CU, and decoding processing is ended. For a node that has no data and is not to be partitioned, decoding processing is directly ended. In summary, the decoder may perform recursive processing on the CTU layer by layer according to the method from 101 to 104 to obtain data of all CUs corresponding to the CTU.

In 106, a decoded picture corresponding to the bitstream data is generated according to all the nodes and data of all CUs.

In the embodiments of the application, the decoder, after obtaining data of all CUs corresponding to the CTU, may generate the decoded picture corresponding to the bitstream data according to all the nodes and data of all CUs.

It is to be noted that, in the embodiments of the application, the decoder, when generating the decoded picture corresponding to the bitstream data according to all the nodes and the data of all CUs, may perform decoding processing on the data of all CUs at first to obtain data of all pixels corresponding to the CTU, and then may generate the decoded picture corresponding to the bitstream data according to the data of all pixels.

Furthermore, in the embodiments of the application, when the decoder performs decoding processing on the data of CUs to obtain the data of all pixels corresponding to the CTU, if the ith node has data and is not to be partitioned segmented, the decoder may decode the data of the ith CU to obtain ith pixel data. If the ith node has data and is to be partitioned, the ith CU data is decoded to obtain the ith background pixel data, and (i+1)th CU data is decoded to obtain ith refreshing pixel data to obtain the ith pixel data. All the nodes are traversed until the data of all pixels is obtained.

Furthermore, in the embodiments of the application, when the decoder generates the decoded picture corresponding to the bitstream data according to the data of all pixels, if the ith node has data and is to be partitioned, refreshing processing is performed on the ith background pixel data according to the ith refreshing pixel data to obtain refreshed pixel data, namely the ith pixel data is obtained. All the nodes are continued to be traversed until the decoded picture is obtained.

That is, if the ith node may not to be continued to be partitioned, namely the ith node is a leaf node in the CTU, the ith pixel data obtained by the decoder by decoding is pixel data corresponding to an ith CU. If the ith node may be continued to be partitioned, namely the ith node is not a leaf node in the CTU, the decoder needs to acquire pixel data corresponding to an (i+1)th CU of the (i+1)th node and then refresh a corresponding region of the pixel data corresponding to the ith CU according to the pixel data corresponding to the (i+1)th CU of the (i+1)th node to obtain the pixel data corresponding to the ith CU.

It is to be noted that, in the embodiments of the application, the decoder, when performing decoding processing on data of all CUs to obtain the data of all pixels corresponding to the CTU, may decode lower-layer data at first and then decode upper-layer data. Specifically, when the decoder performs decoding processing on the data of all CUs to obtain the data of all pixels corresponding to the CTU, if the ith node has data and is to be partitioned, the decoder may acquire and decode the data of the (i+1)th CU to obtain the ith refreshing pixel data corresponding to the ith node, then decode the data of the ith CU to obtain the ith pixel data, and set the ith background pixel data as a background of the ith refreshing pixel data, thereby obtaining the ith CU. The decoder may continue to traverse all the nodes until the data of all pixels is obtained.

It is to be noted that, in the embodiments of the application, if the ith detection result is that there is no data, the ith background pixel data is kept null.

It is to be noted that, in the embodiments of the application, the decoder, when generating the decoded picture according to the data of all CUs, may perform decoding processing on the data of all CUs at first to obtain the data of all pixels corresponding to the CTU. If background pixel data corresponding to a background CU in the data of all pixels and refreshing pixel data corresponding to a refreshing CU have an overlapping region, the decoder may replace the pixel data of the corresponding region of the background CU according to the pixel data of the refreshing CU, namely the background CU is refreshed with the refreshing CU.

That is, in the embodiments of the application, when the decoder generates the decoded picture corresponding to the bitstream data according to all the CUs, if pixel data corresponding to an mth CU in all the CUs and pixel data corresponding to an nth CU have an overlapping region, the decoder may perform refreshing processing on the pixel data corresponding to the mth CU according to the pixel data corresponding to the nth CU to generate the decoded picture. Here, m is an integer greater than 0, and n is an integer greater than m. That is, the nth CU is a refreshing CU of the mth CU.

In the conventional art, when the encoder encodes a video picture, CUs do not overlap, so that any detailed picture information needs detailed partition of CUs, and correspondingly, when the decoder decodes the video picture, CUs obtained by decoding may also have no overlapping regions. By contrast, according to the method for picture decoding disclosed in the embodiments of the application, since overlapping of CUs is supported during picture encoding of the encoder, detailed partition of the picture may be avoided, and correspondingly, when the decoder decodes the video picture, if the background pixel data corresponding to the background CU in the data of all pixels and the refreshing pixel data corresponding to the refreshing CU have an overlapping region, the decoder may replace the pixel data of the corresponding region of the background CU according to the pixel data of the refreshing CU, namely the background CU is refreshed with the refreshing CU.

Furthermore, in the embodiments of the application, in a decoding process, the data, such as prediction information, identification information, and a transformation coefficient, etc., of the background CU may also be refreshed with the data of the refreshing CU.

That is, in the embodiments of the application, in the decoding process of the decoder, the buffered pixel data, or the prediction information, the identification information, the transformation coefficient, etc., use present latest data. The latest data may be the pixel data corresponding to the background CU of the CTU, and may be either data of the background CU that has not been refreshed or data after replacement with the decoded picture of the refreshing CU.

It is to be noted that, in the embodiments of the application, the encoder and the decoder may also allow regional overlapping of CUs in prediction and/or transformation links. Correspondingly, a CTU may include a corresponding background PU and refreshing PU, and may also include a corresponding background TU and refreshing TU.

Furthermore, in the embodiments of the application, in the decoding process, the decoder may refresh information for subsequent block prediction timely or untimely.

Figure 9:
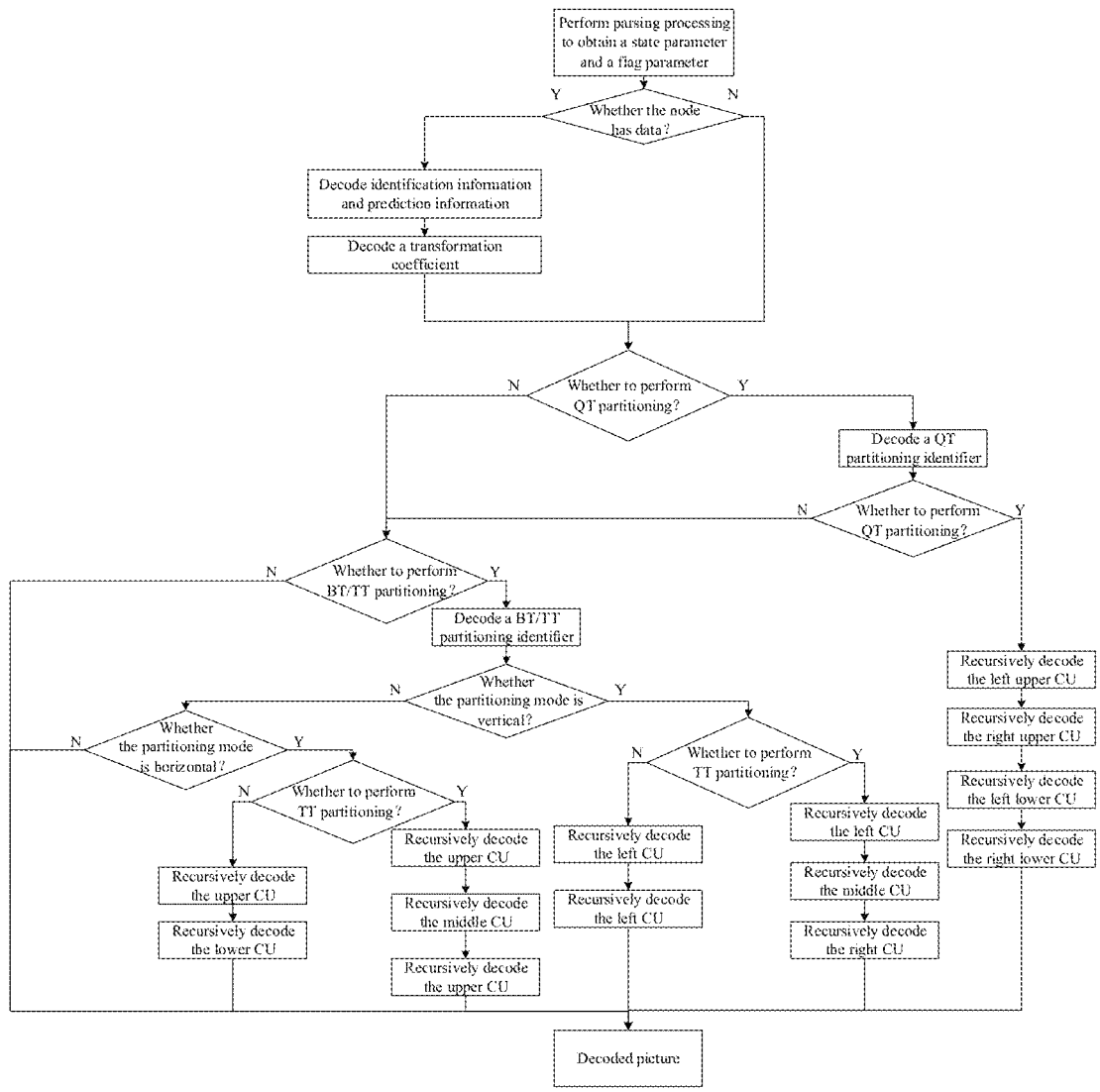
FIG. 9 is a first flowchart of a method for picture decoding according to embodiments of the application.

Based on the method for picture decoding disclosed in 101 to 106, FIG. 9 is a first flowchart of a method for picture decoding according to embodiments of the application. As shown in FIG. 9, for any node that may be continued to be partitioned in the CTU, the decoder may perform parsing processing at first, and determine whether the node has data according to a state parameter and flag parameter obtained by parsing processing. If a detection result is that there is data, the decoder may acquire the data to obtain corresponding identification information, prediction information and transformation coefficient to obtain a corresponding CU by decoding processing, and then enter a partitioning processing flow. If the detection result is that there is no data, the decoder may directly enter the partitioning processing flow. In the partitioning processing flow, the decoder may determine whether QT partitioning may be performed on the node. If it is determined that QT may not be performed, the decoder may continue to determine whether BT partitioning or TT partitioning may be performed on the node. If QT partitioning may be performed, it may be determined whether QT partitioning may be performed on each node obtained by partitioning after QT partitioning is performed on the node, if YES, each node is recursively decoded, and if NO, whether BT partitioning or TT partitioning may be performed on each node obtained by partitioning may be continued to be determined. When BT partitioning or TT partitioning is being determined, it is necessary to determine a partitioning direction of BT partitioning or TT partitioning, namely determining whether vertical partitioning or horizontal partitioning is to be performed, and finally, each node obtained by partitioning is recursively decoded. Finally, data of all CUs corresponding to the CTU may be obtained.

It is to be noted that, in the embodiments of the application, for the condition that there is data on an upper-left side corresponding to the CTU, the decoder may recursively decode an upper-left CU at first, and then parse the data. For the condition that there is data on a left side corresponding to the CTU, the decoder may recursively decode a left CU at first, and then parse the data. For the condition that there is data on an upper side corresponding to the CTU, the decoder may recursively decode an upper CU, and then parse the data.

Figure 10:
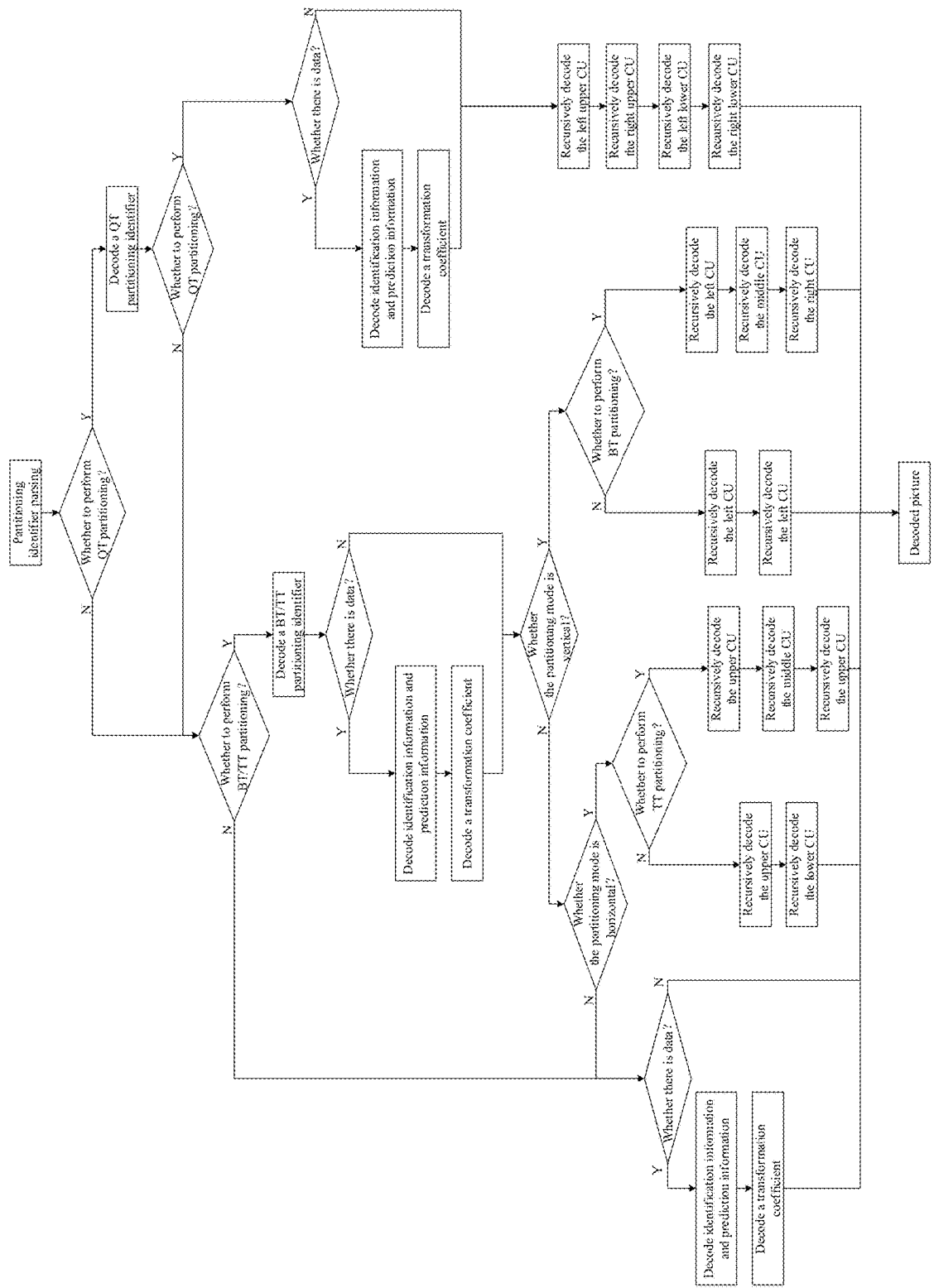
FIG. 10 is a second flowchart of a method for picture decoding according to embodiments of the application.

Furthermore, in the embodiments of the application, the decoder, when decoding the picture, may further perform the flow of determining whether a node has data on each branch after partitioning identifier parsing of the node, so that the number of bits for signal transmission may be reduced effectively. Based on FIG. 9, FIG. 10 is a second flowchart of a method for picture decoding according to embodiments of the application. As shown in FIG. 10, for any node that may be continued to be partitioned in any CTU, the decoder may determine whether QT partitioning may be performed on the node. If it is determined that QT partitioning may not be performed, the decoder may continue to determine whether BT partitioning or TT partitioning may be performed on the node. If QT partitioning may be performed, whether QT partitioning may be performed on each node obtained by partitioning may be determined after QT partitioning is performed on the node, if YES, each node is recursively decoded to obtain a partitioning identifier on a branch on the node, and if NO, whether BT partitioning or TT partitioning may be performed on each node obtained by partitioning may be continued to be determined to obtain the partitioning identifier on the branch on the node. After the partitioning identifier on each branch of the node is obtained by parsing, the decoder may perform parsing processing on each branch, and then determine whether the node has data according to a state parameter and flag parameter obtained by parsing processing. If there is data, the decoder may acquire the data to obtain corresponding identification information, prediction information and transformation coefficient to obtain a CU corresponding to the node, and recursively decode each branch after partitioning. If there is no data, the decoder may directly recursively decode each branch after partitioning. Finally, data of all CUs corresponding to the CTU may be obtained.

The embodiments of the application provide a method for picture decoding. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and the all nodes corresponding to the CTU are traversed until data of the all CUs corresponding to the CTU is obtained. The decoded picture corresponding to the bitstream data is generated according to the all nodes and data of the all CUs. It can be seen that, in the embodiments of the application, in a process of decoding an picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on nodes that have data, to obtain all CUs corresponding to the CTU to obtain a corresponding decoded picture. Since overlapping partitioning of CUs is supported during coding, if all the CUs obtained by the decoder by the decoding nodes that have data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

In another embodiment of the application, based on the abovementioned embodiment, for 102, a method that the decoder determines whether the ith node has data according to the ith state parameter and the ith flag parameter may include the following operations.

In 103a, a leaf parameter corresponding to the ith node is determined, the leaf parameter being configured to determine whether to continue to partition the ith node.

In the embodiments of the application, the decoder may determine the leaf parameter of the ith node at first. Specifically, the leaf parameter may be configured to determine whether the ith node is continued to be partitioned. That is, the decoder determines whether the ith node is a leaf of the CTU at first.

It is to be noted that, in the embodiments of the application, if the ith node is a leaf, namely the ith node has no branch, the decoder may determine that the ith node is not required to be refreshed, but directly performs a normal decoding flow.

It is to be noted that, in the embodiments of the application, if the ith node is not a leaf, namely the ith node has a branch, the decoder may further determine whether to refresh the ith node.

Furthermore, in the embodiments of the application, it may indicate that the ith node is not a leaf node when the leaf parameter is assigned to 0, and it may indicate that the ith node is a leaf node when the leaf parameter is assigned to 1.

In 103b, the ith detection result is obtained according to the leaf parameter, the ith state parameter, and the ith flag parameter.

In the embodiments of the application, the decoder, after determining the leaf parameter of the ith node, may obtain the ith detection result according to the leaf parameter, the ith state parameter, and the ith flag parameter.

It is to be noted that, in the embodiments of the application, in specific syntax transmission for video encoding and decoding, since bAncFlag, Refresh_CU_enable_flag[x0][y0], and Refresh_CU_flag[x0][y0] may not be transmitted, and in addition, Refresh_CU_flag[x0][y0] and Refresh_CU_flag[x0][y0] exist depend on whether the present node is a leaf node or not and bRfrsEnblFlag and bAncFlag, the decoder needs to further infer and determine whether the ith node has data according to the leaf parameter, the ith state parameter, and the ith flag parameter.

In the embodiments of the application, furthermore, the decoder, before continuing to perform parsing processing, partitioning processing, and/or decoding processing on the (i+1)th node, needs to transmit an (i+1)th state parameter at first according to the leaf parameter, the ith state parameter, and the ith flag parameter.

It is to be noted that, in the embodiments of the application, the (i+1)th state parameter may be configured to determine a default state of the (i+1)th node. The (i+1)th state parameter may include an (i+1)th subtree default state and an (i+1)th data default state. Specifically, the (i+1)th subtree default state is configured to represent a state of whether the (i+1)th node supports refreshing, and the (i+1)th data default state is configured to determine whether the (i+1)th node has source data.

Furthermore, in the embodiments of the application, for the (i+1)th node of the CTU, the (i+1)th subtree default state may be determined through a subtree default state of an upper layer, namely the (i+1)th subtree default state may be determined according to the ith subtree default state.

Furthermore, in the embodiments of the application, for the (i+1)th node of the CTU, the (i+1)th data default state may be determined through a data default state of the upper layer, namely the (i+1)th data default state may be determined according to the ith data default state.

Furthermore, in the embodiments of the application, the decoder, when transmitting the (i+1)th state parameter according to the leaf parameter, the ith state parameter, and the ith flag parameter, may determine whether to perform state refreshing at first according to the leaf parameter, the ith state parameter, and the ith flag parameter. If it is determined to perform default state refreshing, the decoder may perform refreshing processing on the ith state parameter to obtain the (i+1)th state parameter. If it is determined not to perform state refreshing, the decoder may determine the ith state parameter as the (i+1)th state parameter.

Table 1 is a combined analysis table of syntax transmission and state refreshing conditions in the embodiments of the application. As shown in Table 1, the decoder may further determine whether a node has data, namely determining whether to decode the node, according to five parameters, i.e., a leaf parameter of the node, a subtree default state represented by bRfrsEnblFlag, a data default state represented by bAncFlag, a subtree flag represented by Refresh_CU_enable_flag[x0][y0], and a data flag represented by RefreshSU_flag[x0][y0]. In addition, the decoder may further determine a subtree default state and data default state of a node of a lower layer through the five parameters of the node. For the first node of the first layer of the CTU, namely when i=1, the default value of the first subtree default state is SPSRfrsEnbl, SPSRfrsEnbl being a flag of whether refreshing is supported, which may be stated in the SPS layer, or may be determined by enable control in the PPS layer. A default value of the first data default state is 0.

TABLE 1

Combined Analysis Table of Syntax Transmission and State Refreshing Conditions

| Leaf parameter | Subtree default state | Data default state | Subtree flag | Data flag | Subtree default state of the lower layer | Data default state of the lower layer | Whether to decode |
|---|---|---|---|---|---|---|---|
| 0 | 0 | — | — | — | No refresh | No refresh | 0 |
| 0 | 1 | 0 | 0 | — | 0 | No refresh | 0 |
| 0 | 1 | 0 | 1 | 1 | 1 | 1 | 1 |
| 0 | 1 | 0 | 1 | 0 | 1 | 0 | 0 |
| 0 | 1 | 1 | — | 1 | 1 | 1 | 1 |
| 0 | 1 | 1 | — | 0 | 1 | 1 | 0 |

TABLE 1-continued

Combined Analysis Table of Syntax Transmission and State Refreshing Conditions

| Leaf parameter | Subtree default state | Data default state | Subtree flag | Data flag | Subtree default state of the lower layer | Data default state of the lower layer | Whether to decode |
|---|---|---|---|---|---|---|---|
| 1 | 0 | — | — | — | No refresh | No refresh | 1 |
| 1 | 1 | 0 | — | — | No refresh | No refresh | 1 |
| 1 | 1 | 1 | — | 1 | No refresh | No refresh | 1 |
| 1 | 1 | 1 | — | 0 | No refresh | No refresh | 0 |
| 0 | 1 | 0 | 0 | — | 0 | No refresh | 0 |

Furthermore, based on Table 1, when a node in the CTU is not a leaf node, namely a leaf parameter is 0, a subtree default state bRfrsEnblFlag is assigned to 1, namely CU refreshing processing of a subtree is supported, a data default state bAncFlag is 0, namely the node has no source data, a subtree flag Refresh_CU_enable_flag[x0][y0] is 0, namely there is no CU that may be refreshed on the subtree of the node, and a data flag Refresh_CU_flag[x0][y0] is not transmitted, the decoder may determine that the node has data according to the above five parameters, and thus determine not to perform decoding processing on the node. Furthermore, the decoder may refresh a subtree default state of a lower layer according to the subtree default state bRfrsEnblFlag of the node, namely the subtree default state transmitted to the lower layer is assigned to 1. In addition, the decoder may determine not to refresh a data default state of the lower layer, namely the data default state transmitted to the lower layer is still 0.

Figure 11:
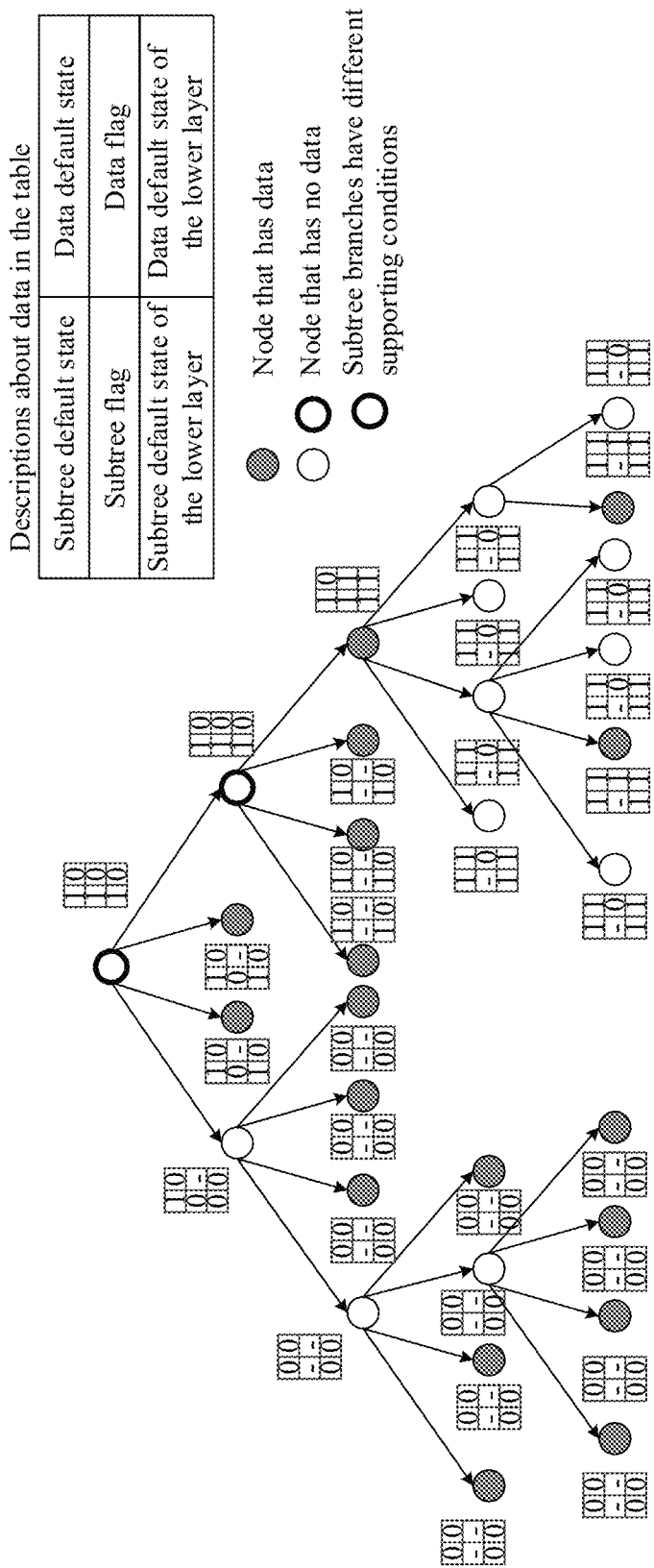
FIG. 11 is a schematic diagram of a state parameter and a flag parameter according to embodiments of the application.

Based on Table 1, FIG. 11 is a schematic diagram of a state parameter and a flag parameter according to embodiments of the application. As shown in FIG. 11, for the first node of the first layer of the CTU, the subtree default state bRfrsEnblFlag of the first node is assigned to 1, namely CU refreshing processing of the subtree is supported, different subtrees of the first node having different supporting conditions, the data default state bAncFlag is 0, namely the node has no source data, the subtree flag Refresh_CU_enable_flag[x0][y0] is 1, namely there is a CU that may be refreshed on the subtree of the first node, and the data flag Refresh_CU_flag[x0][y0] is 0, namely the first node has no data. Since the first node is not a leaf node, namely the leaf parameter is 0, the decoder may determine not to perform decoding processing on the first node based on Table 1, and meanwhile, may determine that the subtree default state transmitted to the node of the lower layer is 1 and the data default state is 0. It can be seen that, for four second nodes of a second layer of the CTU, all subtree default states are 1, and all data default states are 0.

The embodiments of the application provide the method for picture decoding, the decoder, and the storage medium. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and all the nodes corresponding to the CTU are traversed until data of all CUs corresponding to the CTU is obtained. The decoded picture corresponding to the bitstream data is generated according to the all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on nodes that have data, to obtain all CUs corresponding to the CTU to obtain a corresponding decoded picture. Since overlapping partitioning of CUs is supported during coding, if all the CUs obtained by the decoder by decoding nodes that have data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

Based on the abovementioned embodiments, a method that the decoder performs partitioning processing on the ith node to obtain the (i+1)th node of the (i+1)th layer corresponding to the CTU may include the following operations.

In 201, an ith partitioning mode corresponding to the ith node is acquired.

In the embodiments of the application, the decoder, when partitioning the ith node, may acquire the ith partitioning mode corresponding to the ith node at first.

It is to be noted that, in the embodiments of the application, the ith partitioning mode may include one of the following partitioning modes: QT, QTBT, TT, BT, etc. It is to be noted that the ith partitioning mode may also be MTT. MTT is not a solution parallel to QT, BT, and TT, and includes multiple partitioning methods, namely it is a generic term in case of coexistence of QT, BT, and TT. QTBT, similar as MTT, is not a solution parallel to QT and BT, and includes multiple partitioning methods, namely it is a generic term in case of coexistence of QT and BT.

In 202, partitioning processing is performed on the ith node according to the ith partitioning mode to obtain the (i+1)th node.

In the embodiments of the application, the decoder, after acquiring the ith partitioning mode corresponding to the ith node, may perform partitioning processing on the ith node according to the ith partitioning mode to obtain the (i+1)th node.

It is to be noted that, in the embodiments of the application, the decoder performs partitioning processing on the ith node based on the ith partitioning mode, and each ith node may be partitioned to obtain at least two leaves, namely at least two (i+1)th nodes may be obtained.

The embodiments of the application provide the method for picture decoding, the decoder, and the storage medium. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and all nodes corresponding to the CTU are traversed until data of all CUs corresponding to the CTU is obtained. The decoded picture corresponding to the bitstream data is generated according to all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on nodes that have data, to obtain all CUs corresponding to the CTU to obtain a corresponding decoded picture. Since overlapping partitioning of CUs is supported during coding, if all the CUs obtained by the decoder by decoding nodes that have data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

In another embodiment of the application, based on the abovementioned embodiments, partitioning processing during picture decoding of the decoder is exemplarily described according to the method for picture decoding from 101 to 106.

Figure 12:
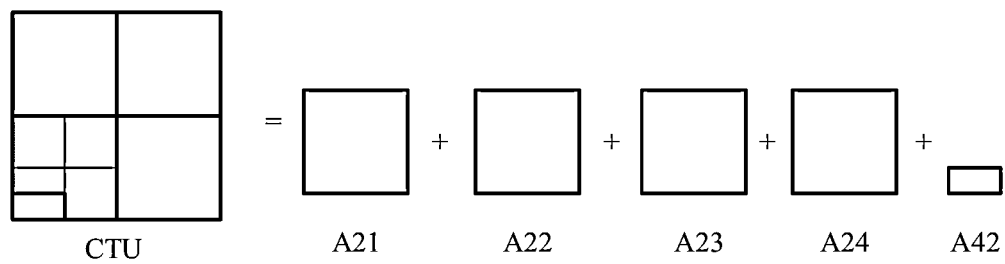
FIG. 12 is a first schematic diagram of partitioning processing.
Figure 13:
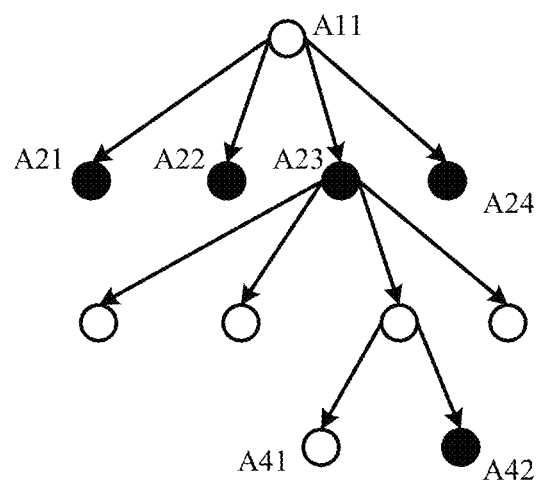
FIG. 13 is a second schematic diagram of partitioning processing.

FIG. 12 is a first schematic diagram of partitioning processing. FIG. 13 is a second schematic diagram of partitioning processing. As shown in FIG. 12 and FIG. 13, all of the upper-left coding block A21, upper-right coding block A22, bottom-left coding block A23 and bottom-right coding block A24 obtained after QT partitioning is performed on a first node A11 that has no data in a CTU have data, namely all of four second nodes of a second layer of the CTU have data. Since A23 may be further partitioned, the encoder may perform QT partitioning on A23 to obtain four third nodes of a third layer, all the four third nodes having no data. Vertical BT partitioning may further be performed on one third node, and two fourth nodes A41 and A42 of a fourth layer are obtained by partitioning. Both A41 and A42 may not be further partitioned, and A42 has data.

It can thus be seen that, according to the method for picture decoding provided in the disclosure, it is only necessary to perform decoding processing on A21, A22, A23, A24 and A42 that have data to obtain corresponding CUs. Since A42 and A23 have an overlapping region, the decoder may refresh the CU corresponding to A23 according to the CU corresponding to A42 to finally obtain a decoded picture corresponding to the CTU.

Figure 14:
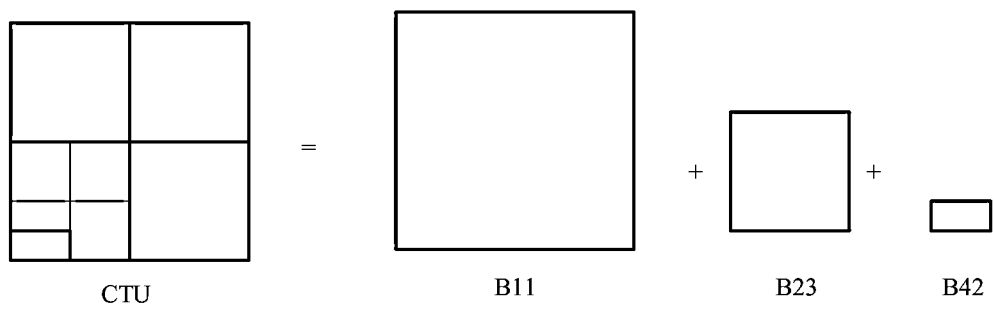
FIG. 14 is a third schematic diagram of partitioning processing.
Figure 15:
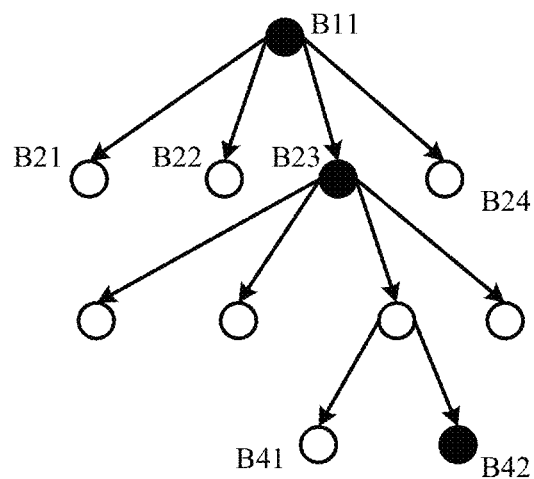
FIG. 15 is a fourth schematic diagram of partitioning processing.

FIG. 14 is a third schematic diagram of partitioning processing. FIG. 15 is a fourth schematic diagram of partitioning processing. As shown in FIG. 14 and FIG. 15, a first node of a first layer of a CTU has data. In the upper-left coding block B21, upper-right coding block B22, bottom-left coding block B23 and bottom-right coding block B24 obtained after QT partition is performed on a first node B11, B23 has data. Since B23 may be further partitioned, the encoder may perform QT partitioning on B23 to obtain four third nodes of a third layer, all the four third nodes having no data. Vertical BT partitioning may further be performed on one third node, and two fourth nodes B41 and B42 of a fourth layer are obtained by the partitioning. Both B41 and B42 may not be further partitioned, and B42 has data. It can thus be seen that, according to the method for picture decoding provided in the disclosure, it is only necessary to perform decoding processing on B11, B23 and B42 that have data to obtain corresponding CUs. Since B23 and B11 have an overlapping region, and B23 and B42 have an overlapping region, the decoder may refresh the CU corresponding to B11 according to the CU corresponding to B23 to obtain a refreshed CU corresponding to B23, and then refresh the refreshed CU corresponding to B23 according to the CU corresponding to B42 to finally obtain a decoded picture corresponding to the CTU.

Figure 16:
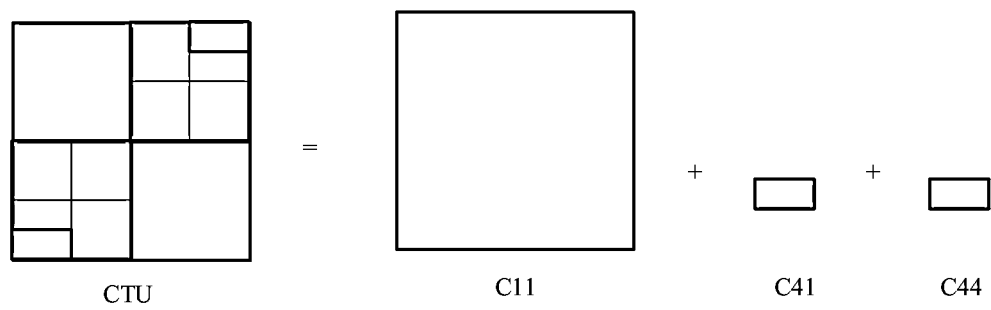
FIG. 16 is a fifth schematic diagram of partitioning processing.
Figure 17:
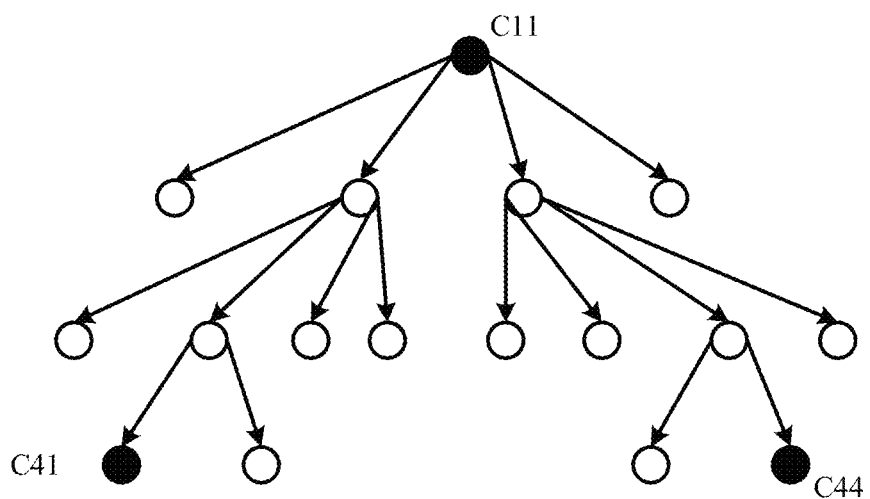
FIG. 17 is a sixth schematic diagram of partitioning processing.

FIG. 16 is a fifth schematic diagram of partitioning processing. FIG. 17 is a sixth schematic diagram of partitioning processing. As shown in FIG. 16 and FIG. 17, a first node of a first layer of a CTU has data, and all of the upper-left coding block C21, upper-right coding block C22, bottom-left coding block C23 and bottom-right coding block C24 obtained after QT partitioning is performed on a first node C11 have no data. Since C22 and C23 may be further partitioned, the coder may perform QT partitioning on C22 and C23 respectively to obtain eight third nodes of a third layer, including four third nodes corresponding to C22 and four third nodes corresponding to C23, all the eight third nodes having no data. Vertical BT partitioning may further be performed on two third nodes, and four fourth nodes C41, C42, C43 and C44 of a fourth layer are obtained by the partitioning. All of C41, C42, C43, and C44 may not be further partitioned, and C41 and C44 have data. It can thus be seen that, according to the method for picture decoding provided in the disclosure, it is only necessary to perform decoding processing on C11, C41 and C44 that have data to obtain corresponding CUs. Since C41 and C44 have overlapping regions with C11 respectively, the decoder may refresh the CU corresponding to C11 according to the CU corresponding to C41, and simultaneously refresh the CU corresponding to C11 according to the CU corresponding to C44 to finally obtain a decoded picture corresponding to the CTU.

The embodiments of the application provide the method for picture decoding, the decoder, and the storage medium. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and all the nodes corresponding to the CTU are traversed until data of all CUs corresponding to the CTU is obtained. The decoded picture corresponding to the bitstream data is generated according to the all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on nodes that have data, to obtain all CUs corresponding to the CTU to obtain a corresponding decoded picture. Since overlapping partitioning of CUs is supported during coding, if all the CUs obtained by the decoder by decoding nodes that have data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

In another embodiment of the application, the method for picture decoding provided in the abovementioned embodiments is provided based on the condition that overlapping of CUs is supported when the encoder performs picture encoding. If overlapping of CUs is supported when the encoder performs picture encoding, detailed partitioning of the picture may be avoided. Correspondingly, when the decoder decodes the video picture, if the background pixel data corresponding to the background CU in data of all pixels and the refreshing pixel data corresponding to the refreshing CU have an overlapping region, the decoder may replace the pixel data of the corresponding region of the background CU according to the pixel data of the refreshing CU, namely the background CU is refreshed with the refreshing CU.

Figure 18:
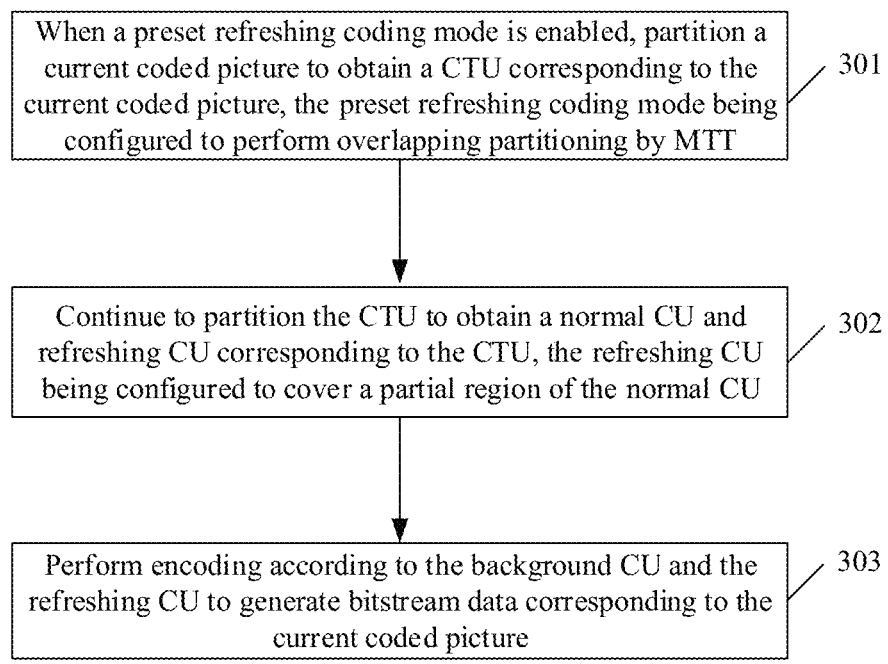
FIG. 18 is a schematic diagram of a method for picture encoding according to embodiments of the application.

In summary, FIG. 18 is a schematic diagram of a method for picture encoding according to embodiments of the application. As shown in FIG. 18, the method for picture encoding performed by an encoder may include the following operations.

In 301, a current coded picture is partitioned to obtain a CTU corresponding to the current coded picture.

In the embodiments of the application, the coder may partition the current coded picture at first, thereby obtaining the CTU corresponding to the current coded picture.

Furthermore, in the embodiments of the application, the encoder encodes multiple frames of pictures in a video one by one during video encoding. The frame of picture under encoding at any moment may be called a current coded picture. The encoder, when encoding the current coded picture in the video, needs to partition the current coded picture into CTUs with the completely same size at first. For example, the encoder may partition the current coded picture to obtain CTUs with the completely same size of 64×64 pixels, namely CTUs formed by 64×64 pixels are obtained.

It is to be noted that, in the embodiments of the application, the encoder may perform overlapping partitioning on the current coded picture. Specifically, the encoder may perform overlapping partitioning on the current coded picture by MTT.

It is to be noted that, in the embodiments of the application, the encoder may set a preset refreshing coding mode and a normal coding mode respectively. The normal coding mode refers to a common coding mode that does not allow overlapping between CTUs and overlapping between CUs. By contrast, the preset refreshing coding mode refers to a coding mode that does not allow overlapping between CTUs. That is, overlapping between CTUs is not allowed in either the preset refreshing coding mode or the normal coding mode.

Furthermore, in the embodiments of the application, the encoder may select to enable the preset refreshing coding mode or the normal coding mode during video encoding. From the encoder side, mode selection may be performed on the preset refreshing coding mode and an original method by Rate Distortion Optimization (RDO), and comparative judgment may be performed in different layers. In an implementation process, a supported refreshed layer number, region number, etc., may also be selected flexibly.

Furthermore, in the embodiments of the application, before the encoder partitions the current coded picture to obtain the CTU corresponding to the current coded picture, namely before operation 301, a coding mode may be switched into the preset refreshing coding mode at first.

It is to be noted that, in the embodiments of the application, the encoder, when partitioning the current coded picture, may perform CTU partitioning according to a raster sequence, and the encoder may obtain multiple CTUs by partitioning.

Furthermore, in the embodiments of the application, after the current coded picture is partitioned into the CTU, further partitioning may be continued to be performed by MTT or another partition technology, and finally, encoding may be performed by taking a CU as a unit.

In 302, the CTU is continued to be partitioned to obtain a background CU and refreshing CU corresponding to the CTU, the refreshing CU being configured to cover a partial region of the background CU.

In the embodiments of the application, the encoder, after partitioning the current coded picture to obtain the CTU corresponding to the current coded picture, may continue to partition the CTU to obtain the background CU and refreshing CU corresponding to the CTU. Both the background CU and the refreshing CU are CUs obtained by further partitioning the CTU and configured for picture encoding.

It is to be noted that, in the embodiments of the application, the refreshing CU may be configured to cover the partial region of the background CU.

Furthermore, in the embodiments of the application, the encoder, after obtaining the CTU, may continue to partition the CTU according to the preset refreshing coding mode, thereby obtaining the background CU and refreshing CU corresponding to the CTU. Specifically, the encoder may extract pixel information in the CTU at first, and then partition the CTU according to the pixel information, so that the CTU may be partitioned into the background CU and the refreshing CU. That is, the encoder may further partition the CTU into the background CU and the refreshing CU according to the pixel information in the CTU, thereby performing picture encoding according to the background CU and the refreshing CU. The partial region of the background CU may be covered and refreshed by the refreshing CU.

Figure 19:
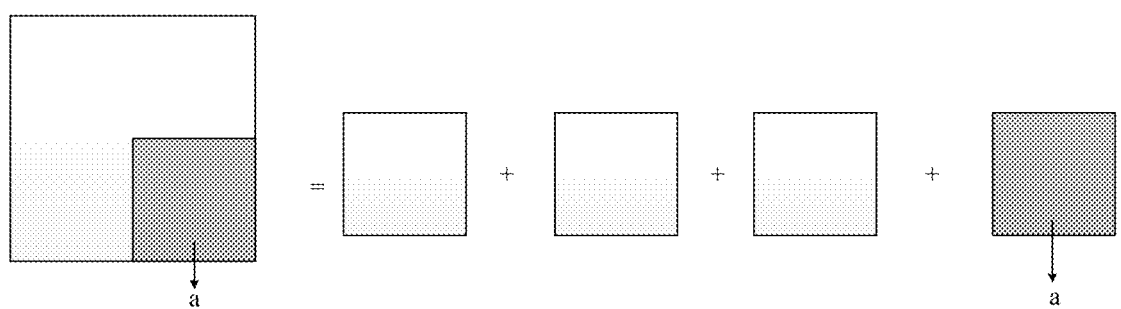
FIG. 19 is a first schematic diagram of non-overlapping partitioning.
Figure 20:
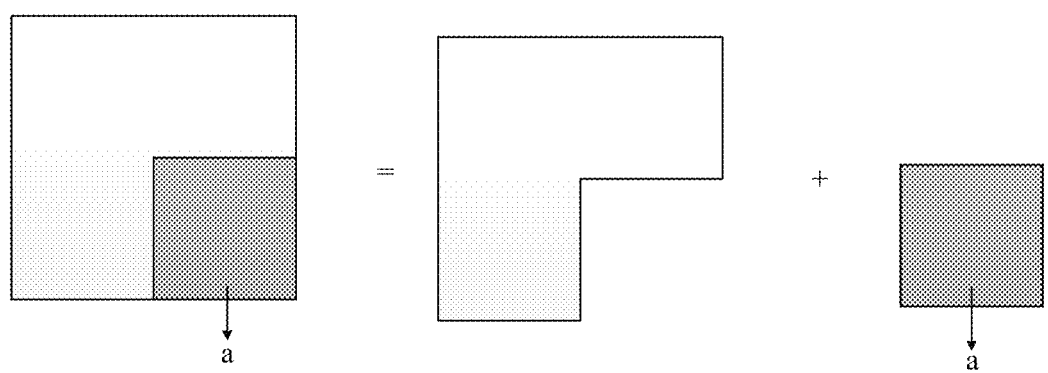
FIG. 20 is a second schematic diagram of non-overlapping partitioning.
Figure 21:
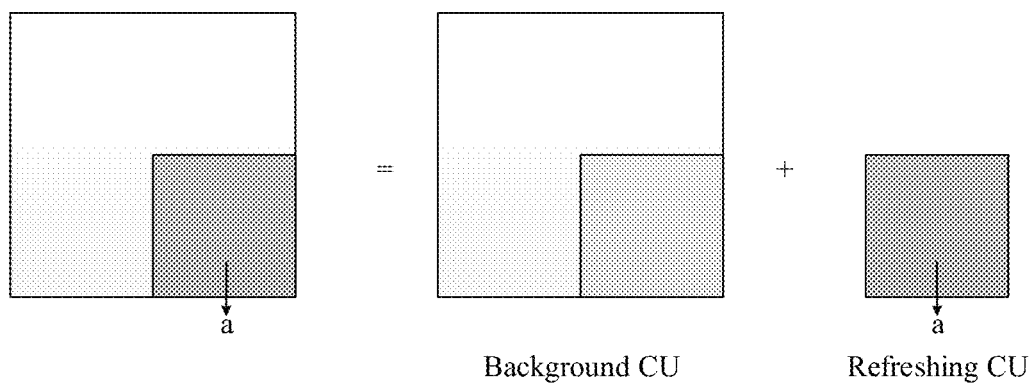
FIG. 21 is a first schematic diagram of overlapping partitioning.
Figure 22:
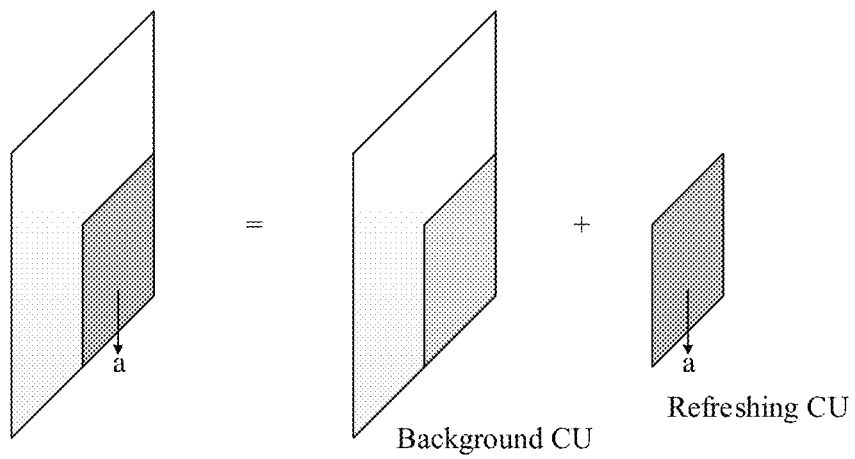
FIG. 22 is a second schematic diagram of overlapping partitioning

FIG. 18 is a first schematic diagram of non-overlapping partitioning. FIG. 19 is a second schematic diagram of non-overlapping partitioning. As shown in FIG. 18 and FIG. 19, according to an existing video coding manner, for a detailed region with a content different from that of another region, for example, a content of region a is different from that of another region, the encoder, before partitioning the CTU, needs to perform detailed partitioning on the CTU according to the manner shown in FIG. 18 or FIG. 19 to achieve a relatively good video coding effect because overlapping between CUs is not allowed. FIG. 20 is a first schematic diagram of overlapping partitioning. FIG. 21 is a second schematic diagram of overlapping partitioning. As shown in FIG. 20 and FIG. 21, for the same region a, since overlapping between CUs is allowed, the encoder, when partitioning the CTU, may specifically partition the CTU into a refreshing CU and a background CU, and then cover a partial region of the background CU with the refreshing CU, to avoid excessively detailed partitioning and effectively reduce the amount of header information.

Furthermore, in the embodiments of the application, data of a pixel domain needs to be transformed to a frequency domain by Discrete Cosine Transform (DCT) and Discrete Sine Transform (DST), and then quantization coding is performed for transmission. For example, in a frame of current picture, a flat picture region with a relatively small amount of pixel information mainly includes low-frequency component, so that all energy after the flat picture region is transformed is concentrated in the upper-left corner. That is, except a few values in the upper-left corner, all numerical values of other regions are substantially 0 during picture coding transmission. In such case, only the few values may be transmitted during transmission to represent pixel data of all regions. Correspondingly, if n pieces of data are required by coding and transmitting the flat picture region, the flat picture region is partitioned into four sub regions for coding transmission, and 4n pieces of non-zero data may be required to represent the region. From the perspective of information, the same information is repeatedly expressed.

Furthermore, in the embodiments of the application, both MTT partitioning and QTBT partitioning are implemented by performing QT partitioning at first and then performing other types of partitioning on each leaf node obtained by QT partitioning.

Furthermore, in the embodiments of the application, in the background CU and refreshing CU obtained by the encoder by partitioning the CTU, one background CU may be allowed to be refreshed by multiple refreshing CUs, or the refreshing CU is allowed to be refreshed with a refreshing CU of a lower layer as a background CU. That is, in the embodiments of the application, the preset refreshing coding mode may allow multi-region refreshing and multilayer refreshing.

It is to be noted that, in the embodiments of the application, a method that the encoder partitions the CTU to obtain the background CU and refreshing CU corresponding to the CTU may specifically include the following operations.

In 302a, the CTU is partitioned to obtain a jth background CU and jth refreshing CU corresponding to a jth layer, j being an integer greater than 0.

In the embodiments of the application, the encoder, after partitioning the current coded picture to obtain the CTU corresponding to the current coded picture, may partition the CTU according to MTT to obtain the jth background CU and jth refreshing CU corresponding to the jth layer, j being an integer greater than 0.

It is to be noted that, in the embodiments of the application, since the preset refreshing coding mode may allow multilayer refreshing, the encoder may partition the CTU to obtain at least one layer of CUs.

In 302b, the jth refreshing CU is partitioned to obtain a (j+1)th background CU and (j+1)th refreshing CU corresponding to a (j+1)th layer.

In the embodiments of the application, the encoder, after partitioning the CTU according to MTT to obtain the jth background CU and jth refreshing CU corresponding to the jth layer, may continue to partition the jth refreshing CU according to MTT to obtain the (j+1)th background CU and (j+1)th refreshing CU corresponding to the (j+1)th layer.

It is to be noted that, in the embodiments of the application, if the CTU includes multiple layers of CUs, the jth refreshing CU of the jth layer may be continued to be partitioned into the (j+1)th background CU and (j+1)th refreshing CU corresponding to the (j+1)th layer. That is, in the background CU and refreshing CU obtained by the encoder by partitioning the CTU, one background CU may be allowed to be refreshed by multiple refreshing CUs, or the refreshing CU is allowed to be refreshed with a refreshing CU of a lower layer as a background CU.

In 303, the CTU is encoded according to the background CU and the refreshing CU to generate bitstream data corresponding to the current coded picture.

In the embodiments of the application, the encoder, after partitioning the CTU to obtain the background CU and refreshing CU corresponding to the CTU, may encode the current coded picture according to the background CU and the refreshing CU to generate the bitstream data corresponding to the current coded picture.

Furthermore, in the embodiments of the application, the encoder, when encoding the CTU according to the background CU and the refreshing CU, may encode the background CU at first, and then encode the refreshing CU, namely the encoder may encode the refreshing CU to generate refreshing bitstream data only after encoding the background CU to generate background bitstream data.

It is to be noted that, in the embodiments of the application, the bitstream data includes the background bitstream data and the refreshing bitstream data.

Furthermore, in the embodiments of the application, the encoder, after encoding the current coded picture according to the background CU and the refreshing CU to generate the bitstream data corresponding to the current coded picture, may transmit the bitstream data. Specifically, in the embodiments of the application, the encoder, when transmitting the bitstream data, may transmit the background bitstream data at first, and then transmit the refreshing bitstream data, namely the encoder, when transmitting the bitstream data, transmits the refreshing bitstream data after transmitting the background bitstream data.

It can thus be seen that, in the embodiments of the application, the encoder, when encoding the CTU according to the preset refreshing coding mode, encodes and transmits the large background CU at first, and then encodes and transmits the refreshing CU. When decoding, correspondingly, the background CU is decoded at first, and then the refreshing CU is decoded.

Furthermore, the coding manner disclosed in the application can be understood as a manner capable of implementing irregular shape partitioning. In a process of encoding by taking a CU as a unit, CUs do not overlap, and instead, the encoder partitions a CTU into a background CU and a refreshing CU. A partial region of the background CU is covered with the refreshing CU, an uncovered region is irregularly shaped, this part is the region that the background CU needs to represent, and the covered region is virtual extended data. QTBT can be considered as a special case of MTT, so that a similar method is implemented after MTT is introduced to VVC.

Furthermore, in the embodiments of the application, the encoder and the decoder may also allow regional overlapping of CUs in prediction and/or transformation links. Correspondingly, a CTU may include a corresponding background PU and refreshing PU, and may also include a corresponding background TU and refreshing TU.

Furthermore, in the embodiments of the application, the encoder may implement an irregular region partitioning method by block subtraction.

According to the method for picture encoding disclosed in the embodiments of the application, the encoder, when performing CU partitioning on a current coded picture in a process of encoding and decoding pictures in a video, may obtain a background CU and refreshing CU, that are partially regionally overlapped, through the preset refreshing coding mode, and then perform encoding. Correspondingly, the decoder, when decoding the current decoding picture according to a preset refreshing decoding, allows the refreshing CU to refresh a local region of the background CU, so that over-partitioning over the video picture may be avoided, unnecessary header information may be reduced, and the coding efficiency may further be improved.

Figure 23:
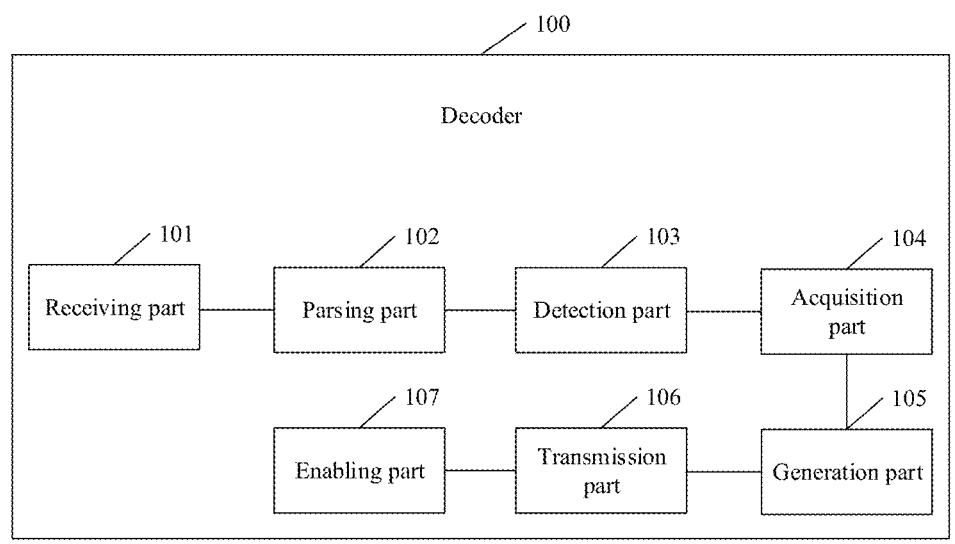
FIG. 23 is a first composition structure diagram of a decoder according to embodiments of the application.

Based on the abovementioned embodiments, in another embodiment of the application, FIG. 23 is a first composition structure diagram of a decoder according to embodiments of the application. As shown in FIG. 23, the decoder 100 disclosed in the embodiments of the application may include a receiving part 101, a parsing part 102, a detection part 103, an acquisition part 104, a generation part 105, a transmission part 106, and an enabling part 107.

The receiving part 101 is configured to receive bitstream data.

The parsing part 102 is configured to parse the bitstream data to obtain a CTU corresponding to the bitstream data.

The parsing part 102 is further configured to parse an ith node of an ith layer corresponding to the CTU to obtain an ith state parameter and ith flag parameter corresponding to the ith node, i being an integer greater than 0, the ith state parameter being configured to determine whether the ith node supports refreshing, and the ith flag parameter being configured to determine whether the ith node enables refreshing.

The detection part 103 is configured to perform detection processing on the ith node according to the ith state parameter and the ith flag parameter to obtain an ith detection result.

The acquisition part 104 is configured to acquire an (i+1)th node of an (i+1)th layer corresponding to the CTU according to the ith detection result.

The detection part 103 is further configured to continue to perform detection processing on the (i+1)th node and traverse all nodes corresponding to the CTU until data of all CUs corresponding to the CTU is obtained.

The generation part 105 is configured to generate a decoded picture corresponding to the bitstream data according to the all nodes and the data of all CUs.

Furthermore, in the embodiments of the application, the acquisition part 104 is specifically configured to determine a leaf parameter corresponding to the ith node, the leaf parameter being configured to determine whether to continue to partition the ith node, and obtain the ith detection result according to the leaf parameter, the ith state parameter, and the ith flag parameter.

Furthermore, in the embodiments of the application, the acquisition part 104 is further specifically configured to, when the ith detection result is that the node has data and is to be partitioned, acquire data of an ith CU of the ith layer and perform segmentation processing on the ith node to obtain the (i+1)th node of the (i+1)th layer corresponding to the CTU; when the ith detection result is that the node has no data and is to be partitioned, perform partitioning processing on the ith node to obtain the (i+1)th node of the (i+1)th layer corresponding to the CTU; when the ith detection result is that the node has data and is not to be partitioned, acquire data of an ith CU of the ith layer and end parsing processing of the ith node; and when the ith detection result is that the node has no data and is not to be segmented, end parsing processing of the ith node.

Furthermore, in the embodiments of the application, the generation part 105 is specifically configured to perform decoding processing on the data of all CUs based on the all nodes to obtain data of all pixels corresponding to the CTU and generate the decoded picture corresponding to the bitstream data according to the data of all pixels.

Furthermore, in the embodiments of the application, the transmission part 106 is configured to, before detection processing is continued to be performed on the (i+1)th node, transmit an (i+1)th state parameter according to the leaf parameter, the ith state parameter, and the ith flag parameter.

Furthermore, in the embodiments of the application, the transmission part 106 is specifically configured to determine, according to the leaf parameter, the ith state parameter, and the ith flag parameter, whether to perform state refreshing; responsive to determining to perform default state refreshing, perform refreshing processing on the ith state parameter to obtain the (i+1)th state parameter; and responsive to determining not to perform state refreshing, determine the ith state parameter as the (i+1)th state parameter.

Furthermore, in the embodiments of the application, the acquisition part 104 is specifically configured to acquire an ith partitioning mode corresponding to the ith node and perform ith partitioning processing on the ith node according to the ith partitioning mode to obtain the (i+1)th node.

Furthermore, in the embodiments of the application, the acquisition part 104 is further specifically configured to, when the ith node has data and is not to be partitioned, decode the data of the ith CU to obtain ith pixel data; when the ith node has data and is to be partitioned, decode the data of the ith CU to obtain ith background pixel data and decode data of an (i+1)th CU to obtain ith refreshing pixel data to obtain the ith pixel data; and traverse the all nodes until the data of all pixels is obtained.

Furthermore, in the embodiments of the application, the acquisition part 104 is further specifically configured to perform refreshing processing on the ith background pixel data according to the ith refreshing pixel data to obtain the ith pixel data and traverse the all nodes until the decoded p[icture is obtained.

Furthermore, in the embodiment of the application, the acquisition part 104 is further specifically configured to, when the ith node has data and is to be partitioned, acquire data of an (i+1)th CU and decode the data of the (i+1)th CU to obtain the ith refreshing pixel data corresponding to the ith node; decode the data of the ith CU to obtain the ith background pixel data and set the ith background pixel data as a background of the ith refreshing pixel data to obtain the ith pixel data; and traverse the all nodes until the data of all pixels is obtained.

Furthermore, in the embodiments of the application, the acquisition part 104 is further specifically configured to, when the ith node has no data, set the ith background pixel data to be null.

Furthermore, in the embodiments of the application, the generation part 105 is further configured to, after detection processing is continued to be performed on the (i+1)th node and the all nodes corresponding to the CTU are traversed until data of all CUs corresponding to the CTU is obtained, perform refreshing processing on data of an ith CU according to data of an (i+1)th CU.

Furthermore, in the embodiments of the application, the enabling part 107 is configured to, after the bitstream data is received and the bitstream data is parsed to obtain the CTU corresponding to the bitstream data, enable a preset refreshing mode, the preset refreshing mode being configured to perform overlapping decoding on the CUs.

Figure 24:
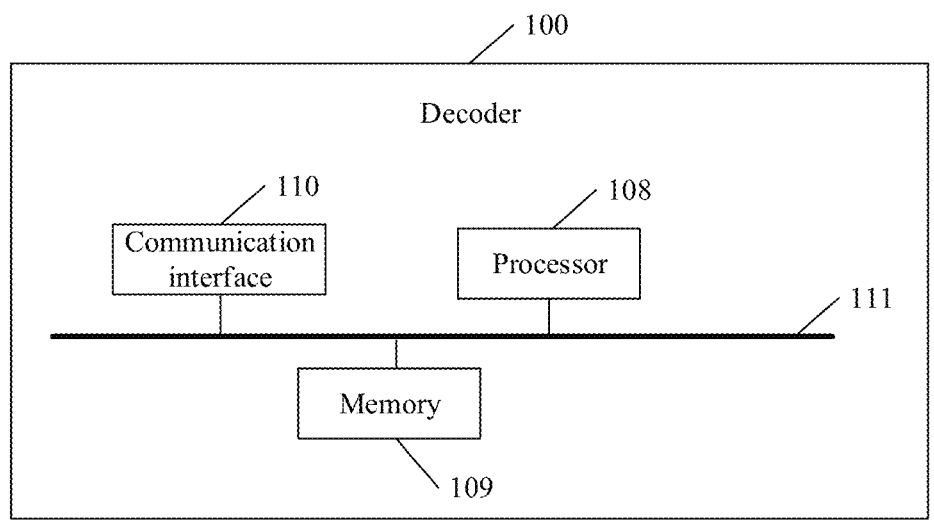
FIG. 24 is a second composition structure diagram of a decoder according to embodiments of the application.

FIG. 24 is a second composition structure diagram of a decoder according to embodiments of the application. As shown in FIG. 24, the decoder 100 disclosed in the embodiments of the application may also include a processor 108, a memory 109 storing instructions executable for the processor 108, a communication interface 110, and a bus 111 configured to connect the processor 108, the memory 109 and the communication interface 110.

Furthermore, in the embodiments of the application, the processor 108 is configured to: receive bitstream data and parse the bitstream data to obtain a CTU corresponding to the bitstream data; parse an ith node of an ith layer corresponding to the CTU to obtain an ith state parameter and ith flag parameter corresponding to the ith node, i being an integer greater than 0, the ith state parameter being configured to determine whether the ith node supports refreshing, and the ith flag parameter being configured to determine whether the ith node enables refreshing; perform detection processing on the ith node according to the ith state parameter and the ith flag parameter to obtain an ith detection result; acquire an (i+1)th node of an (i+1)th layer corresponding to the CTU according to the ith detection result; continue to perform detection processing on the (i+1)th node and traverse all nodes corresponding to the CTU until data of all CUs corresponding to the CTU is obtained; and generate a decoded picture corresponding to the bitstream data according to the all nodes and the data of all CUs.

In the embodiments of the application, the processor 108 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing unit (CPU), a controller, a microcontroller, and a microprocessor. It can be understood that, for different devices, other electronic components may be configured to realize functions of the processor, and no specific limits are made in the embodiment of the application. The memory 109 may be connected with the processor 108. The memory 109 is configured to store an executable program code. The program code includes a computer operation instruction. The memory 109 may include a high-speed Random Access Memory (RAM), and may also include a non-volatile memory, for example, at least two disk memories.

In the embodiments of the application, the bus 111 is configured to connect the communication interface 110, the processor 108, and the memory 109 and implement communications between these devices.

In the embodiments of the application, the memory 109 is configured to store instructions and data.

In practical applications, the memory 109 may be a volatile memory such as a RAM, or a non-volatile memory such as a Read-Only Memory (ROM), a flash memory, a Hard Disk Drive (HDD), or a Solid-State Drive (SSD), or a combination of the memories, and provides instructions and data for the processor.

In addition, each function module in the embodiments may be integrated into a processing unit, each unit may also exist independently, and two or more than two units may also be integrated into a unit. The integrated unit may be implemented in a hardware form and may also be implemented in form of software function module.

When implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes various media capable of storing program codes such as a U disk, a mobile hard disk, a ROM, a RAM, a magnetic disk, or an optical disk.

The embodiments of the application provide a decoder. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and the all nodes corresponding to the CTU are traversed until the data of all CUs corresponding to the CTU is obtained. The decoded picture corresponding to the bitstream data is generated according to the all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on a node that has data, to obtain all CUs corresponding to the CTU to obtain a corresponding decoded picture. Since overlapping partitioning of CUs is supported during coding, if all the CUs obtained by the decoder by decoding nodes with data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

The embodiments of the application provide a computer-readable storage medium having stored therein a computer program which is executed by a processor to implement the method as described in the abovementioned embodiments.

Specifically, a program instruction corresponding to a method for picture decoding in the embodiments may be stored in a storage medium such as an optical disk, a hard disk, and a U disk. When the program instruction corresponding to the image decoding method in the storage medium is read or executed by an electronic device, the following operations are included.

Bitstream data is received, and the bitstream data is parsed to obtain a CTU corresponding to the bitstream data.

An ith node of an ith layer corresponding to the CTU is parsed to obtain an ith state parameter and ith flag parameter corresponding to the ith node, i being an integer greater than 0, the ith state parameter being configured to determine whether the ith node supports refreshing, and the ith flag parameter being configured to determine whether the ith node enables refreshing.

Detection processing is performed on the ith node according to the ith state parameter and the ith flag parameter to obtain an ith detection result.

An (i+1)th node of an (i+1)th layer corresponding to the CTU is acquired according to the ith detection result.

Detection processing is continued to be performed on the (i+1)th node, and all nodes corresponding to the CTU are traversed until data of all CUs corresponding to the CTU is obtained.

A decoded picture corresponding to the bitstream data is generated according to the all nodes and the data of all CUs.

Those skilled in the art should know that the embodiment of the application may be provided as a method, a system or a computer program product. Therefore, the application may adopt a form of hardware embodiment, software embodiment or combined software and hardware embodiment. Moreover, the application may adopt a form of computer program product implemented on one or more computer-available storage media (including, but not limited to, a disk memory, an optical memory and the like) including computer-available program codes.

The application is described with reference to implementation flowcharts and/or block diagrams of the method, device (system) and computer program product according to the embodiments of the application. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the implementation flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the implementation flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the implementation flowcharts and/or one block or multiple blocks in the block diagrams are provided by the instructions executed on the computer or the other programmable data processing device.

The above is only the preferred embodiments of the application and not intended to limit the scope of protection of the application.

INDUSTRIAL APPLICABILITY

The embodiments of the application provide a method for picture decoding, a decoder, and a storage medium. The decoder receives the bitstream data, and parses the bitstream data to obtain the CTU corresponding to the bitstream data. The ith node of the ith layer corresponding to the CTU is parsed to obtain the ith state parameter and ith flag parameter corresponding to the ith node, i being an integer greater than 0, the ith state parameter being configured to determine whether the ith node supports refreshing, and the ith flag parameter being configured to determine whether the ith node enables refreshing. Detection processing is performed on the ith node according to the ith state parameter and the ith flag parameter to obtain the ith detection result. The (i+1)th node of the (i+1)th layer corresponding to the CTU is acquired according to the ith detection result. Detection processing is continued to be performed on the (i+1)th node, and all the nodes corresponding to the CTU are traversed until data of all CUs corresponding to the CTU is obtained. The decoded pictures corresponding to the bitstream data is generated according to the all nodes and the data of all CUs. It can be seen that, in the embodiments of the application, in a process of decoding a picture in a video, after bitstream data is received and parsed to obtain a CTU, parsing processing may be performed on a node of each layer corresponding to the CTU to obtain a state parameter and flag parameter corresponding to the node of this layer, then detection processing is performed on the node according to the state parameter and the flag parameter, and decoding processing is performed on a node with data, to obtain all CUs corresponding to the CTU to obtain a corresponding decoded picture. Since overlapping partitioning of CUs is supported during coding, if all the CUs obtained by the decoder by decoding nodes that have data include at least two regionally overlapping CUs, the decoder may perform refreshing processing on picture information corresponding to a background CU according to picture information corresponding to a refreshing CU. Therefore, over-partitioning of video pictures may be avoided, unnecessary header information may be reduced, distributed repeated representations of data with similar features in the same region may be avoided, and the coding efficiency may further be improved.

The invention claimed is:

1. A method for picture decoding, comprising:
   parsing bitstream data to obtain a Coding Tree Unit (CTU) corresponding to the bitstream data;
   parsing a node of a layer in the cm to determine a state parameter and a flag parameter corresponding to the node, the state parameter being indicative of whether the node supports a refreshing process, and the flag parameter being indicative of whether the node enables the refreshing process, wherein the refreshing process refreshes a corresponding region of pixel data of the node based on the state parameter and the flag parameter; and
   determining a leaf parameter corresponding to the node, the leaf parameter being configured to determine whether to partition the node;
   performing detection processing on the node according to the leaf parameter, the state parameter, and the flag parameter to obtain a detection result; and
   continuing to acquire a node of a next layer corresponding to the CTU according to the detection result;
   wherein the method further comprises:
   enabling a preset refreshing mode, the preset refreshing mode being configured to perform overlapping decoding on the CUs.

2. The method of claim 1, wherein generating the decoded picture corresponding to the bitstream data according to the node and the data of all CUs comprises:
   performing decoding processing on the data of all CUs based on the node to obtain data of all pixels corresponding to the CTU; and
   generating the decoded picture corresponding to the bitstream data according to the data of all pixels.

3. The method of claim 2, wherein the method further comprises:
   performing detection processing on the node according to the leaf parameter to obtain a detection result;
   continuing to acquire a node of a next layer corresponding to the CTU according to the detection result;
   continuing to perform detection processing on the node of the next layer, and obtaining data of all Coding Units (CUs) corresponding to the CTU; and
   generating a decoded picture corresponding to the bitstream data according to the node and the data of all CUs.

4. The method of claim 1, before continuing to perform detection processing on the node of the next layer, further comprising:
   transmitting a state parameter of the next layer according to the leaf parameter, the state parameter, and the flag parameter.

5. The method of claim 4, wherein transmitting the state parameter of the next layer according to the leaf parameter, the state parameter, and the flag parameter comprises:
   determining, according to the leaf parameter, the state parameter, and the flag parameter, whether to perform the refreshing process;
   responsive to determining to perform the refreshing process, performing the refreshing processing on the state parameter to obtain the state parameter of the next layer; and
   responsive to determining not to perform the refreshing process, determining the state parameter as the state parameter of the next layer.

6. The method of claim 1, wherein the state parameter is a first state parameter, and wherein the node of the next layer corresponds to a second state parameter that is determined by parsing the node of the next layer and configured to determine whether the node of the next layer supports refreshing.

7. A decoder, comprising a processor and a memory storing instructions executable by the processor, wherein when the instructions are executed by the processor, the processor is configured to:
   parse bitstream data to obtain a Coding Tree Unit (CTU) corresponding to the bitstream data;
   parse a node of a layer in the cm to determine a state parameter and a flag parameter corresponding to the node, the state parameter being indicative of whether the node supports a refreshing process, and the flag parameter being indicative of whether the node enables the refreshing process, wherein the refreshing process refreshes a corresponding region of pixel data of the node based on the state parameter and the flag parameter;
   perform detection processing on the node according to the leaf parameter, the state parameter, and the flag parameter to obtain a detection result; and
   continuing to acquire a node of a next layer corresponding to the cm according to the detection result;
   wherein the processor is further configured to enable a preset refreshing mode, the preset refreshing mode being configured to perform overlapping decoding on the CUs.

8. The decoder of claim 7, wherein
   the processor is specifically configured to perform decoding processing on the data of all CUs based on the node to obtain data of all pixels corresponding to the CTU and generate the decoded picture corresponding to the bitstream data according to the data of all pixels.

9. The decoder of claim 8, wherein the processor is further configured to:
   perform detection processing on the node according to a leaf parameter to obtain a detection result;
   continue to acquire a node of a next layer corresponding to the CTU according to the detection result;
   continue to perform detection processing on the node of the next layer, and obtain data of all Coding Units (CUs) corresponding to the CTU; and
   generate a decoded picture corresponding to the bitstream data according to the node and the data of all CUs.

10. The decoder of claim 7, wherein
    the processor is further configured to, before detection processing is continued to be performed on the node of the next layer, transmit a state parameter of the next layer according to the leaf parameter, the state parameter, and the flag parameter.

11. The decoder of claim 10, wherein
    the processor is specifically configured to determine, according to the leaf parameter, the state parameter, and the flag parameter, whether to perform the refreshing process; responsive to determining to perform the refreshing process, perform the refreshing processing on the state parameter to obtain the state parameter of the next layer; and responsive to determining not to perform the refreshing process, determine the state parameter as the state parameter of the next layer.

12. The decoder of claim 7, wherein the state parameter is a first state parameter, and wherein the node of the next layer corresponds to a second state parameter that is determined by parsing the node of the next layer and configured to determine whether the node of the next layer supports refreshing.

13. A non-transitory computer-readable storage medium having stored therein a computer program which is applied to a decoder and is executed by a processor to perform:

parsing bitstream data to obtain a Coding Tree Unit (CTU) corresponding to the bitstream data;

parsing a node of a layer in the ctu to determine a state parameter and a flag parameter corresponding to the node, the state parameter being indicative of whether the node supports a refreshing process, and the flag parameter being indicative of whether the node enables the refreshing process, wherein the refreshing process refreshes a corresponding region of pixel data of the node based on the state parameter and the flag parameter; and determining a leaf parameter corresponding to the node, the leaf parameter being configured to determine whether to partition the node;

performing detection processing on the node according to the leaf parameter, the state parameter, and the flag parameter to obtain a detection result; and continuing to acquire a node of a next layer corresponding to the ctu according to the detection result wherein the computer program is executed by the processor to further perform:

enabling a preset refreshing mode, the preset refreshing mode being configured to perform overlapping decoding on the CUs.

14. The non-transitory computer-readable storage medium of claim 13, wherein generating the decoded picture corresponding to the bitstream data according to the node and the data of all CUs comprises:

performing decoding processing on the data of all CUs based on the node to obtain data of all pixels corresponding to the CTU; and generating the decoded picture corresponding to the bitstream data according to the data of all pixels.

15. The method of claim 14, wherein the computer program is executed by the processor to further perform:

performing detection processing on the node according to the leaf parameter to obtain a detection result;

continuing to acquire a node of a next layer corresponding to the CTU according to the detection result;

continuing to perform detection processing on the node of the next layer, and obtaining data of all Coding Units (CUs) corresponding to the CTU; and generating a decoded picture corresponding to the bitstream data according to the node and the data of all CUs.

16. The non-transitory computer-readable storage medium of claim 13, wherein before continuing to perform detection processing on the node of the next layer, the computer program is executed by the processor to further perform:

transmitting a state parameter of the next layer according to the leaf parameter, the state parameter, and the flag parameter.

17. The non-transitory computer-readable storage medium of claim 16, wherein transmitting the state parameter of the next layer according to the leaf parameter, the state parameter, and the flag parameter comprises:

determining, according to the leaf parameter, the state parameter, and the flag parameter, whether to perform the refreshing process;

responsive to determining to perform the refreshing process, performing the refreshing processing on the state parameter to obtain the state parameter of the next layer; and responsive to determining not to perform the refreshing process, determining the state parameter as the state parameter of the next layer.

18. The non-transitory computer-readable storage medium of claim 13, wherein the state parameter is a first state parameter, and wherein the node of the next layer corresponds to a second state parameter that is determined by parsing the node of the next layer and configured to determine whether the node of the next layer supports refreshing.

* * * * *